US012645569B2

(12) United States Patent
Mugaluru Srinivasaiah et al.

(10) Patent No.: US 12,645,569 B2
(45) Date of Patent: Jun. 2, 2026

(54) SYSTEMS AND METHODS FOR IMPROVED TESTING OF SYSTEM IMPLEMENTATION GIVEN PARTIALLY DEFINED INPUT VALUES AND EXPECTED OUTPUT VALUES

(71) Applicant: Honeywell International Inc., Charlotte, NC (US)

(72) Inventors: Nagaraj Mugaluru Srinivasaiah, Bangalore (IN); Devesh Bhatt, Maple Grove, MN (US); Shanmugavalli Kannaiyan, Bangalore (IN); Jan Hvozdovic, Prague (CZ)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/814,264

(22) Filed: Aug. 23, 2024

(65) Prior Publication Data

US 2026/0010463 A1    Jan. 8, 2026

(30) Foreign Application Priority Data

Jul. 5, 2024    (IN) .............................. 202411051627

(51) Int. Cl.
*G06F 11/00* (2006.01)
*G06F 11/3668* (2025.01)
(52) U.S. Cl.
CPC ................................. *G06F 11/3684* (2013.01)
(58) Field of Classification Search
CPC .................................................. G06F 11/3684
(Continued)

(56) References Cited

U.S. PATENT DOCUMENTS 8,640,065 B2    1/2014  Janssen et al.
10,460,058 B2   10/2019 Elliott
(Continued)

FOREIGN PATENT DOCUMENTS

CN      115062570 A    9/2022
GB        2614356 A    7/2023
WO     2022128469 A1   6/2022

OTHER PUBLICATIONS

European Patent Office, "Extended European Search Report", dated Oct. 2, 2025, from EP Application No. 25182288.8, from Foreign Counterpart to U.S. Appl. No. 18/814,264, pp. 1 through 12, Published: EP.

*Primary Examiner* — Sarai E Butler
(74) *Attorney, Agent, or Firm* — Fogg & Powers LLC

(57) ABSTRACT

Systems and methods for improved testing of system implementation are described herein. In one example, a method includes receiving a test case based on requirements for a system, wherein a first subset of all system inputs includes defined system inputs for the test case, wherein a second subset of all system inputs includes undefined system inputs for the test case. The method further includes generating extended test vectors from the test case by replacing the undefined system inputs for the test case with different values, wherein each respective extended test vector includes a different combination of values for the undefined system inputs from other extended test vectors. The method further includes executing the extended test vectors on a target platform for the system. The method further includes verifying whether outputs generated during execution of the extended test vectors match expected values for the defined system outputs for the test case.

20 Claims, 17 Drawing Sheets

(58) Field of Classification Search
USPC ........................................................ 714/1–57
See application file for complete search history.

(56) References Cited

U.S. PATENT DOCUMENTS

| | | | |
|---|---|---|---|
| 11,763,054 B2 | 9/2023 | Elliott et al. | |
| 2013/0117609 A1* | 5/2013 | Dande ................. | G06F 11/3692 |
| | | | 714/E11.177 |
| 2013/0159068 A1* | 6/2013 | Chang .................... | A63F 13/00 |
| | | | 705/7.41 |
| 2019/0207962 A1* | 7/2019 | Wang .................... | G06F 21/552 |
| 2020/0242012 A1 | 7/2020 | Hicks et al. | |
| 2021/0263837 A1 | 8/2021 | Hicks et al. | |
| 2022/0019721 A1* | 1/2022 | Hershkovitz ....... | G06F 30/3323 |
| 2022/0292006 A1* | 9/2022 | Ramachandran ... | G06F 11/3428 |
| 2023/0080117 A1* | 3/2023 | Unesaki ................. | G06F 11/27 |
| | | | 714/30 |
| 2023/0259449 A1 | 8/2023 | Mietke | |

* cited by examiner

Figures 4B, 4C, 4D:
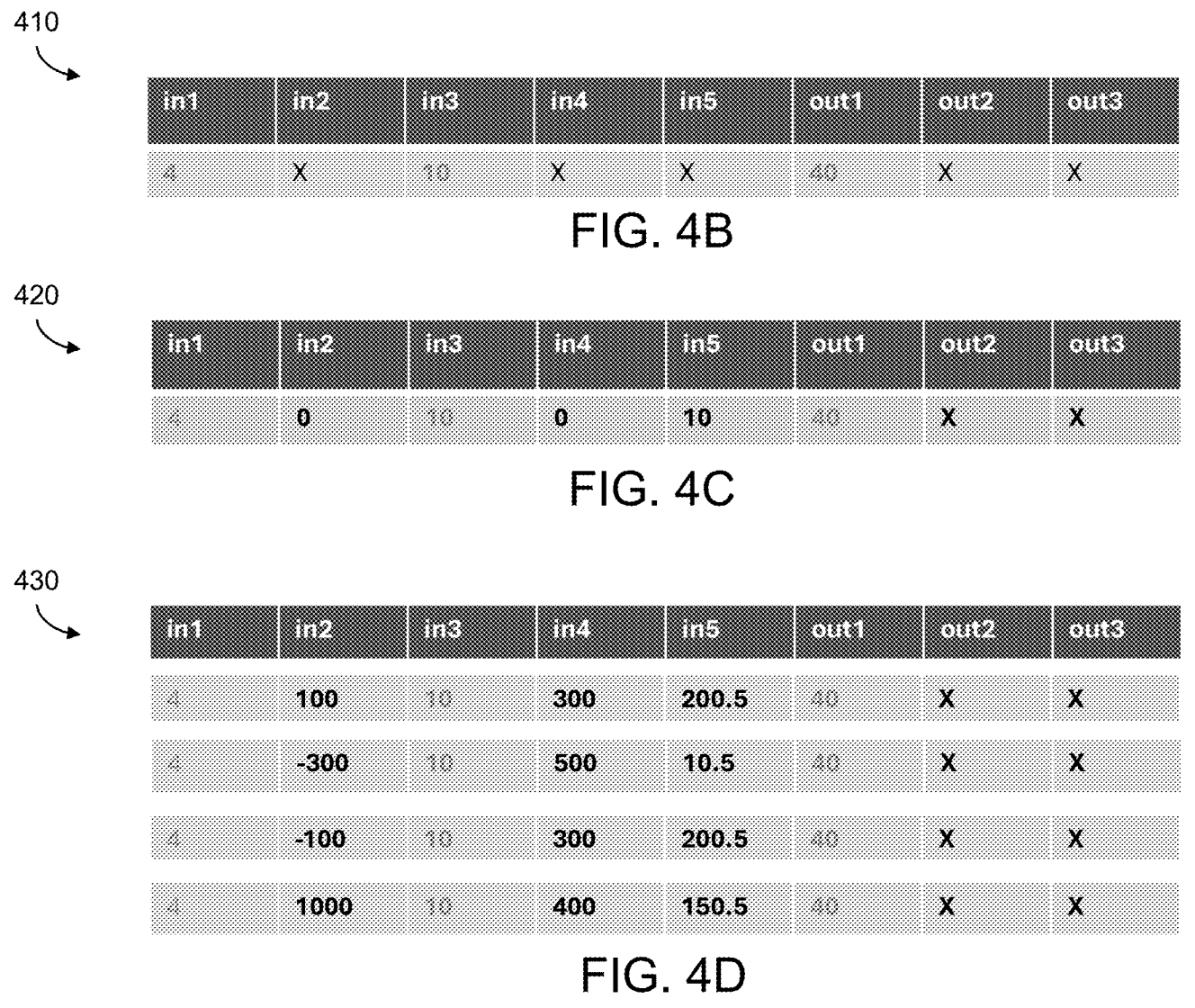

410

| In1 | In2 | In3 | In4 | In5 | out1 | out2 | out3 |
|-----|-----|-----|-----|-----|------|------|------|
| x | x | x | x | x | x | x | x |

| In1 | In2 | In3 | In4 | In5 | out1 | out2 | out3 |
|-----|-----|-----|-----|-----|------|------|------|
| x | 0 | x | 0 | 10 | x | x | x |

| In1 | In2 | In3 | In4 | In5 | out1 | out2 | out3 |
|-----|-----|-----|-----|-----|------|------|------|
| x | 100 | x | 300 | 200.5 | x | x | x |
| x | -300 | x | 500 | 10.5 | x | x | x |
| x | -100 | x | 300 | 200.5 | x | x | x |
| x | 1000 | x | 400 | 150.5 | x | x | x |

| Test Vector # | Inputs | | | | Expected Outputs | |
|---|---|---|---|---|---|---|
| | in1 | in2 | in3 | in4 | out1 | out2 |
| 1 | X | X | 0 | 0 | X | 1 |

520

| Test Vector # | Inputs | | | | Expected Outputs | | Test Pass/Fail |
|---|---|---|---|---|---|---|---|
| | in1 | in2 | in3 | in4 | out1 | out2 | |
| 1 | 0 | 0 | 0 | 0 | X | 1 | Pass |

530

| Test vector # | Inputs | | | | Expected Outputs | | Test Pass/Fail | |
|---|---|---|---|---|---|---|---|---|
| | in1 | in2 | in3 | in4 | out1 | out2 | | |
| 1 | 0 | 0 | 0 | 0 | X | 1 | Pass | 532 |
| 2 | 1 | 1 | 0 | 0 | X | 1 | Fail | 534 |
| 3 | 0 | 1 | 0 | 0 | X | 1 | Fail | 536 |
| 4 | 1 | 0 | 0 | 0 | X | 1 | Pass | 538 |

540

| Test vector # | Inputs | | | | Expected Outputs | | Test Pass/Fail |
|---|---|---|---|---|---|---|---|
| | in1 | in2 | in3 | in4 | out1 | out2 | |
| 1 | 0 | 0 | 0 | 0 | X | 1 | Pass |
| 2 | 1 | 1 | 0 | 0 | X | 1 | Pass |
| 3 | 0 | 1 | 0 | 0 | X | 1 | Pass |
| 4 | 1 | 0 | 0 | 0 | X | 1 | Pass |

| Test vector # | Inputs | | | | Expected Outputs | | Test Pass/Fail |
|---|---|---|---|---|---|---|---|
| | in1 | in2 | in3 | in4 | out1 | out2 | |
| 1 | 0 | 0 | 0 | 0 | X | 1 | Pass |
| 2 | 1 | 0 | 0 | 0 | X | 1 | Pass |

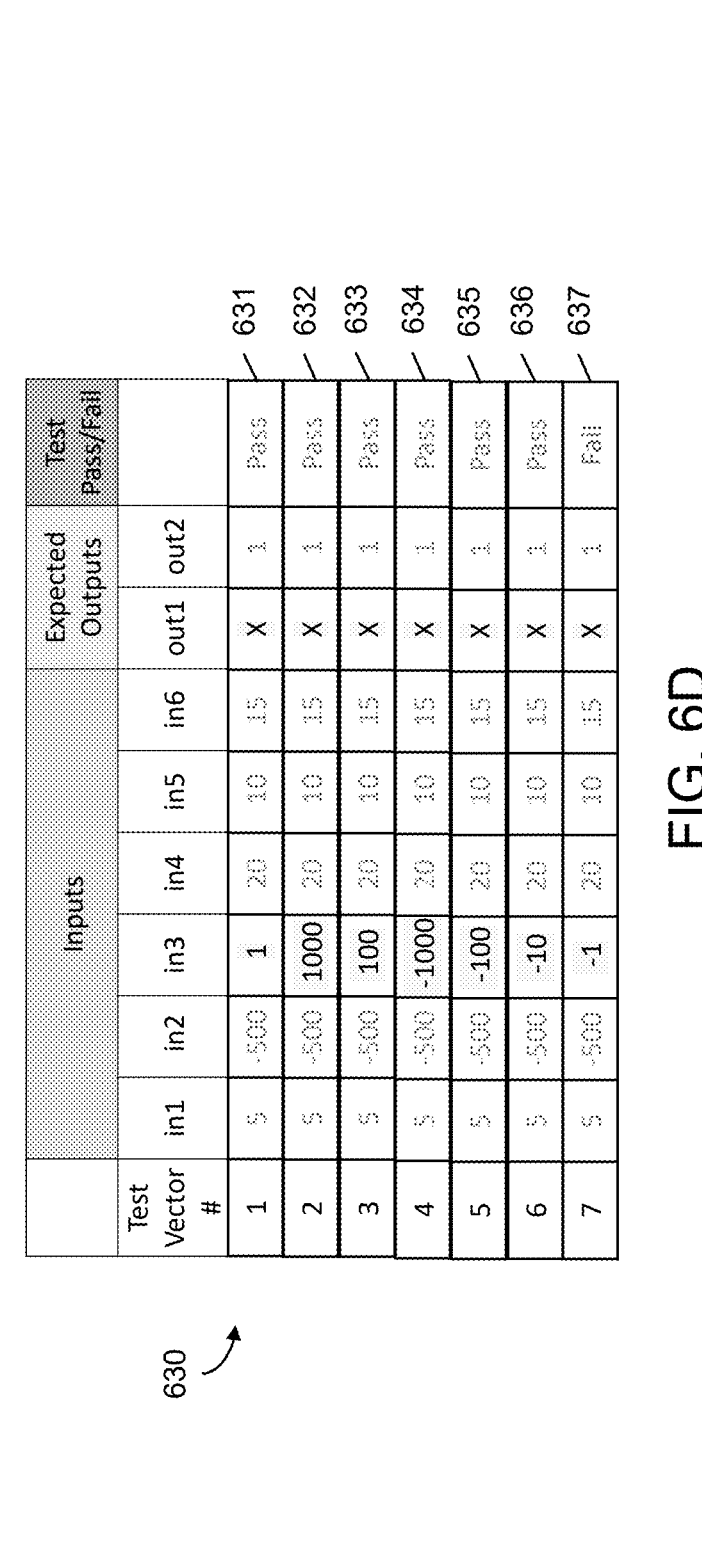
FIG. 6B (610)
| Test Vector # | Inputs | | | | | | Expected Outputs | |
|---|---|---|---|---|---|---|---|---|
| | in1 | in2 | in3 | in4 | in5 | in6 | out1 | out2 |
| 1 | 5 | -500 | X | 20 | 10 | 15 | X | 1 |
FIG. 6C (620)
| Test Vector # | Inputs | | | | | | Expected Outputs | | Test Pass/Fail |
|---|---|---|---|---|---|---|---|---|---|
| | in1 | in2 | in3 | in4 | in5 | in6 | out1 | out2 | |
| 1 | 5 | -500 | 1 | 20 | 10 | 15 | X | 1 | Pass |
FIG. 6D (630)
| Test Vector # | Inputs | | | | | | Expected Outputs | | Test Pass/Fail | |
|---|---|---|---|---|---|---|---|---|---|---|
| | in1 | in2 | in3 | in4 | in5 | in6 | out1 | out2 | | |
| 1 | 5 | -500 | 1 | 20 | 10 | 15 | X | 1 | Pass | 631 |
| 2 | 5 | -500 | 1000 | 20 | 10 | 15 | X | 1 | Pass | 632 |
| 3 | 5 | -500 | 100 | 20 | 10 | 15 | X | 1 | Pass | 633 |
| 4 | 5 | -500 | -1000 | 20 | 10 | 15 | X | 1 | Pass | 634 |
| 5 | 5 | -500 | -100 | 20 | 10 | 15 | X | 1 | Pass | 635 |
| 6 | 5 | -500 | -10 | 20 | 10 | 15 | X | 1 | Pass | 636 |
| 7 | 5 | -500 | -1 | 20 | 10 | 15 | X | 1 | Fail | 637 |

Figure 6F:
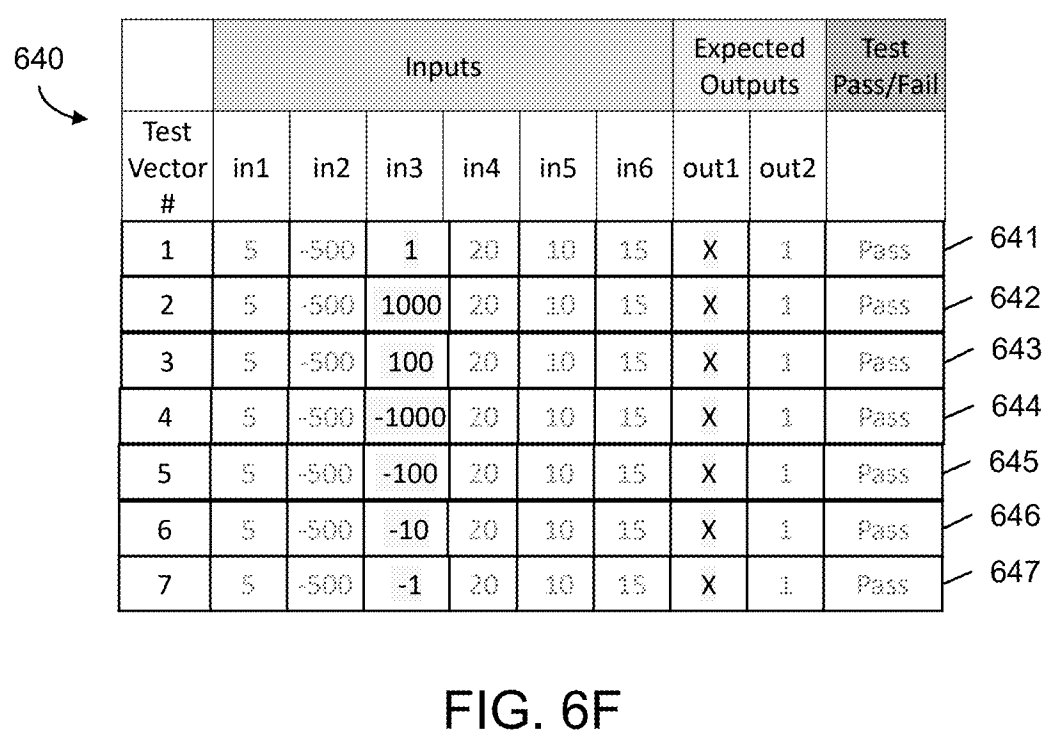

| Test Vector # | Inputs | | | | | | Expected Outputs | | Test Pass/Fail |
|---|---|---|---|---|---|---|---|---|---|
| | in1 | in2 | in3 | in4 | in5 | in6 | out1 | out2 | |
| 1 | 5 | -500 | 1 | 20 | 10 | 15 | X | 1 | Pass |
| 2 | 5 | -500 | 1000 | 20 | 10 | 15 | X | 1 | Pass |
| 3 | 5 | -500 | 100 | 20 | 10 | 15 | X | 1 | Pass |
| 4 | 5 | -500 | -1000 | 20 | 10 | 15 | X | 1 | Pass |
| 5 | 5 | -500 | -100 | 20 | 10 | 15 | X | 1 | Pass |
| 6 | 5 | -500 | -10 | 20 | 10 | 15 | X | 1 | Pass |
| 7 | 5 | -500 | -1 | 20 | 10 | 15 | X | 1 | Pass |

| Test Vector # | Execution steps | Inputs | | | | | Expected Outputs | | Test Pass/Fail |
|---|---|---|---|---|---|---|---|---|---|
| | | in1 | in2 | in3 | in4 | in5 | out1 | out2 | |
| 1 | 1 | 10 | 1 | 20 | 10 | 15 | X | 1 | Pass |
| | 1 | X | 1 | 20 | 10 | 15 | X | 1 | Pass |

| Test Vector # | Execution steps | Inputs | | | | | Expected Outputs | | Test Pass/Fail |
|---|---|---|---|---|---|---|---|---|---|
| | | in1 | in2 | in3 | in4 | in5 | out1 | out2 | |
| 1 | 1 | 10 | 1 | 20 | 10 | 15 | X | 1 | Pass |
| | 1 | 10 | 1 | 20 | 10 | 15 | X | 1 | Pass |

| Test Vector # | Execution steps | Inputs | | | | | Expected Outputs | | Test Pass/Fail | |
|---|---|---|---|---|---|---|---|---|---|---|
| | | in1 | in2 | in3 | in4 | in5 | out1 | out2 | | |
| 1 | 1 | 10 | 1 | 20 | 10 | 15 | X | 1 | Pass | — 731 |
| | 1 | 10 | 1 | 20 | 10 | 15 | X | 1 | Pass | — 732 |
| 2 | 1 | 10 | 1 | 20 | 10 | 15 | X | 1 | Pass | — 733 |
| | 1 | 100 | 1 | 20 | 10 | 15 | X | 1 | Pass | — 734 |
| 3 | 1 | 10 | 1 | 20 | 10 | 15 | X | 1 | Pass | — 735 |
| | 1 | 1000 | 1 | 20 | 10 | 15 | X | 1 | Fail | — 736 |

| Test Vector # | Inputs | | | | Expected Outputs | | Test Pass/Fail |
|---|---|---|---|---|---|---|---|
| | in1 | in2 | in3 | in4 | out1 | out2 | |
| 1 | 5 | 10 | X | X | 15 | X | Pass |

| Test Vector # | Inputs | | | | Expected Outputs | | Test Pass/Fail |
|---|---|---|---|---|---|---|---|
| | in1 | in2 | in3 | in4 | out1 | out2 | |
| 1 | 5 | 10 | 1 | 1 | 15 | X | Pass |

| Test Vector # | Inputs | | | | Expected Outputs | | Test Pass/Fail | |
|---|---|---|---|---|---|---|---|---|
| | in1 | in2 | in3 | in4 | out1 | out2 | | |
| 1 | 5 | 10 | 1000 | 1 | 15 | X | Pass | 831 |
| 2 | 5 | 10 | 100 | 1 | 15 | X | Pass | 832 |
| 3 | 5 | 10 | -1000 | 1 | 15 | X | Pass | 833 |
| 4 | 5 | 10 | -100 | 1 | 15 | X | Pass | 834 |
| 5 | 5 | 10 | 0 | 1 | 15 | X | Overflow exception | 835 |

FIG. 8D

SYSTEMS AND METHODS FOR IMPROVED TESTING OF SYSTEM IMPLEMENTATION GIVEN PARTIALLY DEFINED INPUT VALUES AND EXPECTED OUTPUT VALUES

CROSS-REFERENCE TO RELATED APPLICATION

This application claims priority to Indian Application No. 202411051627 filed on Jul. 5, 2024, the contents of which are incorporated herein by reference in their entirety.

BACKGROUND

Requirements-based system testing (for example, black or gray box testing) is a primary method used for verification of a system or subsystem implementation. Requirements-based system testing involves creation of test cases based on requirements and then execution of test cases in a simulation environment or on hardware to detect errors in the system implementation. The test cases are developed based on behavior oriented functional requirements and use cases, and the test cases are defined with respect to a required subset of system inputs and expected outputs for a particular requirement/use case. The intent of the system testing is to test the system response based only on the partial set of system inputs, and the expected response is defined as a partial set of outputs corresponding to the limited scope of each requirement in the test case. Therefore, a proper test case definition consists of values for only a partial subset of inputs and expected outputs.

In current testing methods, if a test case requires only a subset of input values, then default values are automatically set for inputs that are not defined in the test case when converting to an executable and actual values (in the implementation) are computed for all outputs during the test execution. If the actual output values computed during the test execution do not match the expected output values in the test case, then this suggests there is an error in the system implementation. Unfortunately, even if the actual output values computed during the test execution do match the expected output values in the test case, this does not necessarily indicate the absence of an error in the system implementation because the default values applied to the undefined inputs may result in the actual output values being calculated by the system to match expected output values in the test case. Thus, it is important to determine whether the actual output values computed during the test execution are due only to the partial input values defined in the test case.

However, the current testing methods do not have any means of showing that the default values used for inputs not defined in the test case (and not relevant to the test case) do not have any impact on the expected output value. Therefore, existing testing methods are not particularly effective for detecting potential error in a system implementation and do not provide confidence that expected system output value(s) is calculated only from defined system input values for a particular system requirement.

For the reasons above, and for other reasons discussed herein, there is a need for techniques that provide higher quality requirements-based testing.

SUMMARY

In an aspect, a method is described herein. The method includes receiving a test case based on requirements for a system, wherein a first subset of all system inputs includes defined system inputs for the test case, wherein a second subset of all system inputs includes undefined system inputs for the test case. The method further includes generating extended test vectors from the test case by replacing the undefined system inputs for the test case with different values, wherein each respective extended test vector includes a different combination of values for the undefined system inputs from other extended test vectors. The method further includes executing the extended test vectors on a target platform for the system. The method further includes verifying whether outputs generated during execution of the extended test vectors match expected values for the defined system outputs for the test case.

In another aspect, a non-transitory, computer readable medium is described herein. The non-transitory, computer readable medium storing instructions which, when executed by one or more processors, cause the one or more processors to perform a process. The process includes receiving an original test vector based on requirements for a system, wherein at least one system input is defined for the original test vector and a first system input is undefined for the original test vector, wherein an expected value for at least one output is defined for the original test vector. The process further includes generating extended test vectors for the original test vector by replacing the first system input that is undefined for the original test vector with different values, wherein each respective extended test vector includes a different value for the first system input. The process further includes executing the extended test vectors on a target platform. The process further includes verifying whether outputs generated during the execution match expected values for the defined system outputs.

In another aspect, a system is described herein. The system includes an input configured to receive information about a system under test. The system under test includes one or more inputs, wherein a value for at least one input of the one or more inputs is undefined for a test vector based on requirements for the system under test. The system under test further includes one or more functions, wherein each function of the one or more functions is configured to generate a respective function output based on, at least in part, a value of at least one of the one or more inputs. The system under test further includes one or more outputs, wherein each output of the one or more outputs is configured to generate a respective output value based on, at least in part, at least one of the respective function outputs. The system further includes one or more computational elements coupled to a memory. The one or more computational elements are configured to receive a test vector file that includes one or more test vectors, wherein each test vector is based on requirements for the system under test, wherein at least one system input is undefined for at least one execution step of each of the one or more test vectors. The one or more computational elements are further configured to generate respective extended test vectors for each respective test vector of the one or more test vectors by replacing undefined system inputs for the respective test vector with different values, wherein the respective extended test vectors generated from the respective test vector include different combinations of values for the undefined system inputs for the respective test vector. The one or more computational elements are further configured to generate an extended test vector file that includes the generated extended test vectors for each respective test vector of the one or more test vectors.

BRIEF DESCRIPTION OF THE DRAWINGS

Understanding that the drawings depict only some embodiments and are not therefore to be considered limiting in scope, the exemplary embodiments will be described with additional specificity and detail using the accompanying drawings, in which:

FIG. 4B is a table representing an example test vector for the system in FIG. 4A;

FIG. 4C is a table representing an example execution result using a previous test method;

FIG. 4D is a table representing an example execution result using the techniques described herein;

FIG. 5F is a table representing an example execution result for the modified system in FIG. 5E using the techniques described herein;

FIG. 5G is a table representing a modified test vector and example execution results for the system in FIG. 5A;

FIG. 6B is a table representing an example test vector for the system in FIG. 6A;

FIG. 6C is a table representing an example execution result using a previous test method;

FIG. 6D is a table representing an example execution result using the techniques described herein;

FIG. 6F is a table representing an example execution result for the modified system in FIG. 6E using the techniques described herein;

FIG. 7B is a table representing an example test vector for the system in FIG. 7A;

FIG. 7C is a table representing an example execution result using a previous test method;

FIG. 7D is a table representing an example execution result using the techniques described herein;

FIG. 8B is a table representing an example test vector for the system in FIG. 8A;

FIG. 8C is a table representing an example execution result using a previous test method; and FIG. 8D is a table representing an example execution result using the techniques described herein.

Figure 1:
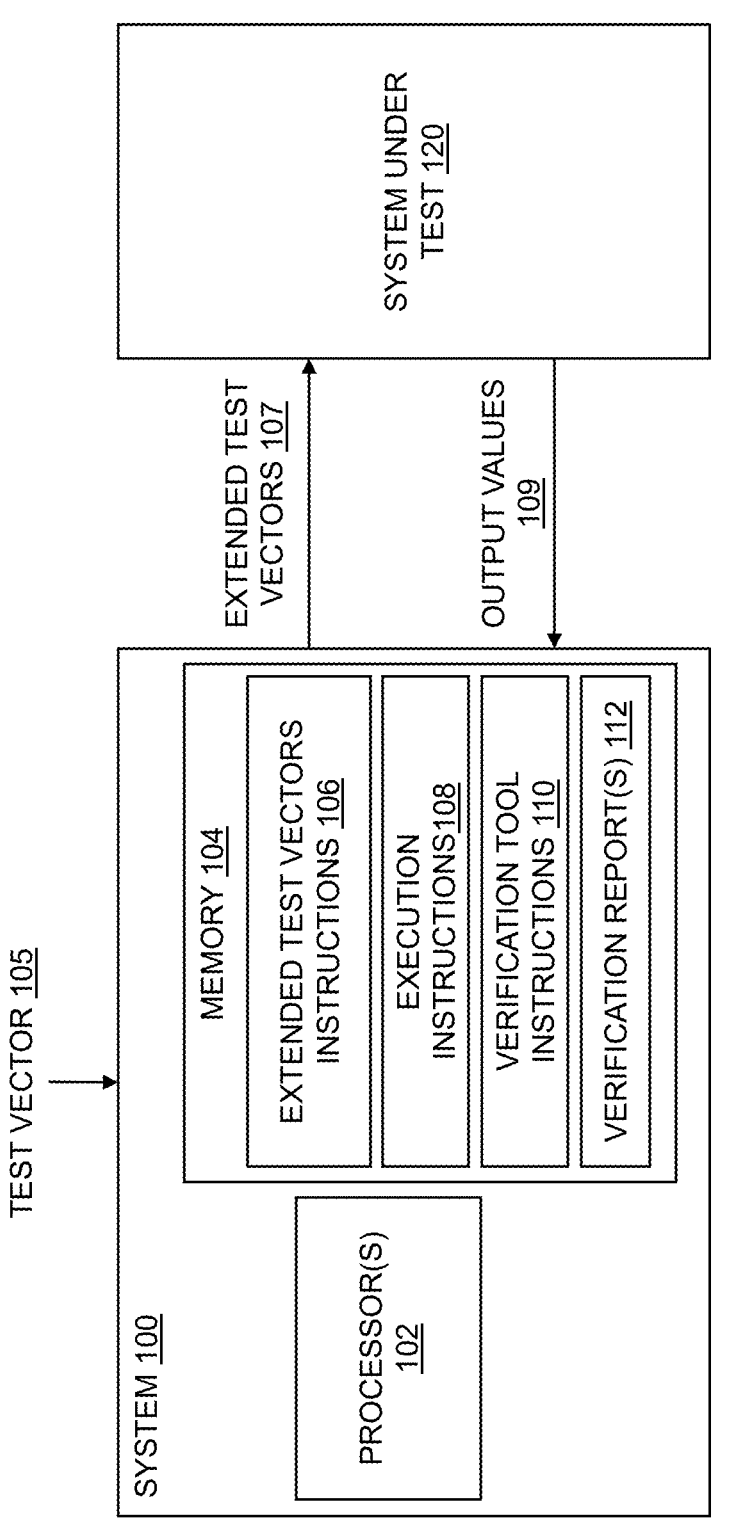
FIG. 1 is a diagram of an example system.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which are shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The techniques described herein improve testing of system implementations using test cases with partially defined inputs. The examples described herein generate multiple tests for a particular test case with partial input values defined by exercising multiple combinations of values for undefined inputs in the test case. These multiple tests are then executed on the system implementation to verify actual output values against expected partial output values. The examples described herein exercise the multiple combinations of values for inputs not defined in the test case and verify that the expected partial output values in the test case are not impacted by the undefined inputs. This provides higher confidence in the system implementation.

FIG. 1 is a block diagram of an example system 100 in which the techniques described herein can be implemented. In the example shown in FIG. 1, the system 100 includes one or more processors 102 and at least one memory 104. In the example shown in FIG. 1, the at least one memory 104 includes extended test vector instructions 106, execution instructions 108, and verification tool instructions 110.

While the extended test vector instructions 106, the execution instructions 108, and the verification tool instructions 110 are described as separate with respect to the system 100 of FIG. 1, it should be understood that they can be combined into a tool used to evaluate a system under test. Further, while the extended test vector instructions 106, the execution instructions 108, and the verification tool instructions 110 are shown as being stored in the same memory 104 in FIG. 1, it should be understood that they can be stored in different memories 104 as well.

The system 100 is configured to evaluate system designs based on partially defined inputs and provide information that can be used to modify a system under test 120. In particular, the system 100 is configured to generate extended test vectors 107 for execution during evaluation of the system under test 120 and verify the system output values 109 generated from the execution of the extended test vectors 107.

In some examples, the system 100 is only used to evaluate the system under test 120. In such examples, the details about the system under test 120 including inputs, functions, topology information between the inputs and functions, and outputs are provided to the system 100 prior to evaluation. In some examples, the system 100 can also be used to modify the system under test 120 as discussed below with respect to FIG. 2. In such examples, the system 100 is aware of the inputs, functions, topology, and outputs of the system under test 120.

In some examples, the system 100 and the system under test 120 are implemented on the same processor(s) 102. In some such examples, the system 100 is configured to evaluate the system under test 120 in an emulation or simulation environment. In some examples, the system 100 is configured to simulate the features of the system under test 120 in software. In some examples, the system under test 120 can be simulated as a model, for example, using MATLAB SIMULINK, SCADE, or another simulation tool. In some examples, the system 100 and the system under test 120 are implemented on different processor(s) 102.

In the example shown in FIG. 1, the system 100 is configured to receive a test vector 105 (also referred to herein as a "test scenario") that is used to test various functionality of the system under test 120. In some examples, the test vector 105 is provided to the system 100 via user input (for example, via file upload or manual entry into a user interface of the system 100). In some examples, the test vector 105 includes defined input values for a subset of the system inputs, output values that should be produced by the system for the particular input values, and the number of execution steps. The test vector 105 for a particular system under test 120 includes an input that is undefined for at least one execution step. In some examples, the test vector 105 for a particular system under test 120 includes an output that is undefined for at least one execution step. When inputs are undefined for a particular test vector 105, a value is assigned to each of those undefined inputs prior to execution of the system under test 120. It should be understood that the inputs can also be referred to as unknown, undetermined, indefinite, or a similar term to undefined. The term "undefined" is used herein and should be understood to cover these various alternatives as well.

The one or more processors 102 are configured to execute the extended test vector instructions 106 to generate multiple extended test vectors 107 corresponding to the test vector 105. The multiple extended test vectors 107 are provided to the system under test 120. As discussed in more detail below, the system 100 is configured to generate multiple extended test vectors 107 that each have a different combination of values for the undefined inputs in the test vector 105. In some examples, the different combination of values for the undefined inputs in the test vector are generated based on different heuristic types considering system constraints. The heuristic types can include, but are not limited to, a random testing (including techniques of fuzz testing), combinatorial interaction testing, adaptive and guided testing for each normal range (including a minimum value of a normal range for each of the undefined inputs, a maximum value of the normal range for each of the undefined inputs, a mid-range value of the normal range (for example, within approximately 10% of the middle value between the minimum and maximum values of the operational range) for each of the undefined inputs, and/or alternating between a minimum value of the normal range and a maximum value of the normal range), and/or evolutionary and hybrid algorithms with/without considering previous values with normal range for the undefined inputs.

In this context, the "normal range" for the undefined inputs refers to a normal operational range that is defined by the domain, and the values generated for the undefined inputs in the test vector 105 can be designed to be generated within the normal operational range. In some examples, the normal range for each of the undefined inputs is provided to the system 100 via user input (for example, via file upload or manual entry into a user interface of the system 100).

In some examples, techniques can also use values outside of a normal range within system constraints. For example, for Boolean functions/operators following heuristic types considering system constraints can be included, but are not limited to, random values, walking values, inverting values, and/or checkboard values for the undefined inputs.

The types of system constraints are dependent on the requirements of the system under test, the type of input, etc.

A system constraint can define a range of values for a particular input. A system constraint can also set a particular relationship between different inputs of the system under test 120, which could include, for example, that one input is always greater than another input. A system constraint can also set a particular relationship between the same input of the system under test 120 at different execution steps, which could include, for example, that the value of the input at an execution step is greater than the value of that input at a previous execution step in a sequence. It should be understood that these are particular examples and that other types of system constraints can be used.

In some examples, the one or more processors 102 are also configured to execute the execution instructions 108, which cause the one or more processors 102 to execute the system under test 120. In some examples, the execution instructions 108, when executed by the one or more processors 102, cause the one or more processors 102 to execute the system under test 120 multiple times using a different respective extended test vector each time. That is, each execution of the system under test 120 is performed using a different combination of values for the undefined inputs compared to the other executions of the system under test 120.

The one or more processors 102 are also configured to execute the verification tool instructions 110, which cause the one or more processors 102 to determine whether the output values 109 generated using each of the multiple extended test vectors 107 match the expected output values (defined outputs) for the test case.

In some examples, the one or more processors 102 are configured to execute the verification tool instructions 110 to generate verification reports 112. The verification reports 112 can indicate whether or not the output values 109 generated using each of the extended test vectors 107 match the expected output values from the test vector 105. In some examples, if the values generated using a particular extended test vector match the expected output values from the test vector 105, then the verification reports 112 include a "pass" indication for that particular extended test vector 109. In some examples, if the output values 109 generated using a particular extended test vector do not match the expected output values from the test vector 105, then the verification reports 112 include a "fail" indication for that particular extended test vector. The verification reports 112 can be used to identify errors in the system under test 120 and/or the test vector 105.

In some examples, matching can include a tolerance such that an exact correspondence is not required in order for the verification reports 112 to include a "pass" indication for output values 109 for different extended test vectors 107. This tolerance can be used for certain types of output values 109 such as, for example, floating point values or other numeric values. The particular tolerance for an output value 109 can be based on the type of output value 109, the required accuracy of the system under test 120, and other factors specific to the system under test 120.

By using the techniques described herein, the system 100 can confirm with more confidence that output values 109 determined during the execution of the system under test 120 are determined from the defined input values only and not based on the assumed values or default values for system inputs that are undefined in the test vector 105.

Figure 2:
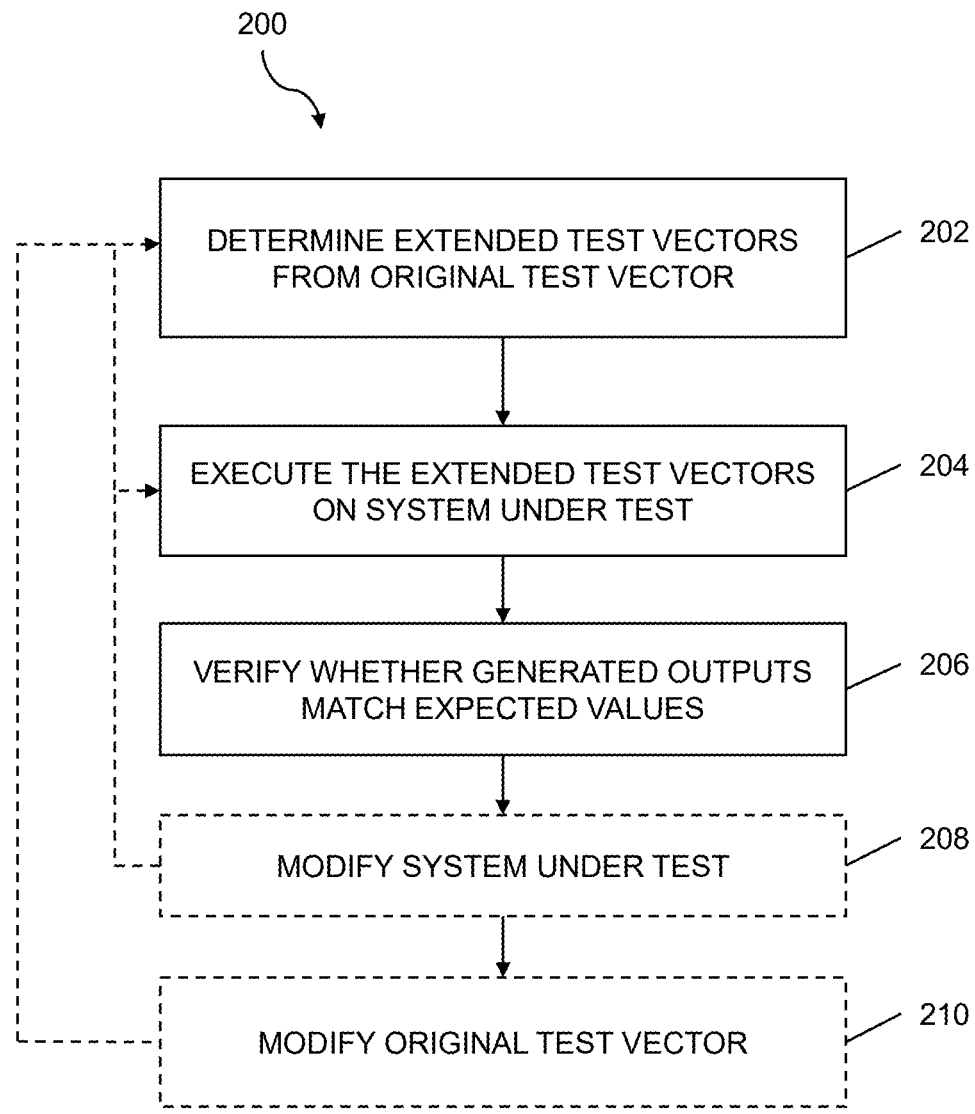
FIG. 2 is a flow diagram of an example method of evaluating a system under test.

FIG. 2 illustrates a flow diagram of an example method 200 of evaluating a system under test. The common features discussed above with respect to the example system in FIG. 1 can include similar characteristics to those discussed with respect to method 200 and vice versa. In some examples, at least some blocks of the method 200 are performed by the system 100 described above.

The blocks of the flow diagram in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel in an event-driven manner).

The method 200 includes generating extended test vectors from an original test vector (block 202). In some examples, generating extended test vectors from the original test vector includes generating two or more extended test vectors from the original test vector. The extended test vectors are generated by replacing inputs that are undefined in the original test vector with different values. In particular, each extended test vector generated from the original test vector will have a different combination of values for the undefined inputs compared to the other extended test vectors generated from the original test vector. Theoretically, there is no limit to the number of extended test vectors that can be generated for testing. However, the time and expense of conducting the testing should be considered in practice when determining the number of extended test vectors to generate from the original test vector.

The original test vector can include defined inputs and defined outputs for the behavior of the system under test being evaluated. In some examples, the number of system inputs defined in the original test vector is less than the total number of inputs for the system under test and at least one of the inputs is undefined in the original test vector. That is, the original test vector includes at least one undefined input in addition to the defined inputs. Further, the original test vector may include one or more undefined outputs in addition to the defined outputs.

The values for the defined inputs and the expected values for the defined outputs from the original test vector are the same for each of the extended test vectors. Values are generated for each of the undefined inputs such that the extended test vectors include values for each input of the system under test and can be executed. The values for the undefined outputs are not generated for the extended test vectors and do not play a part in the analysis performed when executing the extended test vectors. However, in some examples, one or more abnormal values can be observed for the undefined outputs, and this may result in an exception or erroneous scenario. In such examples, this information can also be used to improve the system under test.

In some examples, heuristic values are determined for each of the undefined inputs in the original test vector, and each of the heuristic values is determined based on a heuristic type. Each extended test vector is generated by replacing each respective undefined input with a respective heuristic value. The extended test vectors have different combinations of values included for the undefined inputs from the original test vector. In other words, the particular combination of heuristic values that replace the undefined inputs for a particular extended test vector differ from the combination of heuristic values that replace the undefined inputs for all of the other extended test vectors.

When there is a sequence of multiple test vectors or execution steps for the original test vector (for example, when testing time-dependent functionality), then the extended test vectors generated mirror the sequence of multiple test vectors or execution steps. An example of test vectors with multiple execution steps is discussed below with respect to FIGS. 7A-7D.

The process for generating extended test vectors is further discussed with respect to FIG. 3 below.

The method 200 further includes executing the extended test vectors on the system under test (block 204). In some examples, the extended test vectors are executed in sequence on the system under test. In other examples, the extended test vectors are executed in parallel on the system under test. As part of the execution of the extended test vectors, outputs are generated for the defined outputs of the system under test for each of the extended test vectors.

The method 200 further includes verifying whether the generated outputs match the expected values (block 206). In some examples, the values of the generated outputs for each of the extended test vectors are compared to the expected values of the defined outputs from the original test vector. In some examples, the values of the generated outputs are determined to match the expected values when the values of the generated outputs correspond exactly to the expected values of the defined outputs from the original test vector. In other examples, the values of the generated outputs are determined to match the expected values when the values of the generated outputs are within a tolerance amount of the expected values. The tolerance amount can be based on a number of factors including, but not limited to, the type of output, the type of system under test, required accuracy of the system under test, etc.

In some examples, verifying whether the generated outputs match the expected values further includes generating verification reports that indicate to a user whether or not the output values generated using each of the extended test vectors match the expected output values from the original test vector. In some examples, if the values generated using a particular extended test vector match the expected output values from the test vector, then the verification reports include a "pass" indication for that particular extended test vector. In some examples, if the values generated using a particular extended test vector do not match the expected output values from the test vector, then the verification reports include a "fail" indication for that particular extended test vector.

In some examples, the method 200 optionally includes modifying the system under test (block 208). A modification to the system under test is generally made if at least one of the generated outputs for an extended test vector is determined to not match an expected output value from the original test vector. For example, if there is a "fail" indication for at least one of the extended test vectors, then further investigation as to the cause of the failure is conducted and one or more changes can be made to the system under test to potentially correct the issue causing the failure. In general, the modification of the system under test is made manually by a user reviewing the results of the verification. Modifying the system under test can include, but is not limited to, modifying the connections between the inputs and functions, modifying the connections between different functions, modifying the connection between the functions and the outputs, etc. Some specific example changes to the system under test are discussed below with respect to FIGS. 5E-5F and FIGS. 6E-6F.

In some examples, the method 200 proceeds back to block 202 from block 208 and generates additional extended test vectors that are different from the extended test vectors generated for the previous execution(s). That is, the combination of values for at least one of the additional test vectors is different than the combination of values for the extended test vectors generated for the previous execution(s). In such examples, the method 200 proceeds with blocks 204 and 206 using the additional test vectors. It should be understood that the additional test vectors can be generated at block 202 before, in parallel, or after completing the modification of the system in block 208.

In other examples, the method 200 proceeds back to block 204 from block 208 and uses the extended test vectors generated for the previous executions. That is, the same extended test vectors that were used and resulted in a "fail" indication as used again after the system modification. In such examples, the method 200 proceeds with blocks 204 and 206 using the additional test vectors.

In some examples, the method 200 optionally includes modifying the original test vector (block 210). A modification to the original test vector, and relevant requirements for the system under test driving that test vector, is generally made if at least one of the generated outputs for an extended test vector is determined to not match an expected output value from the original test vector. For example, if there is a "fail" indication for at least one of the extended test vectors, then further investigation as to the cause of the failure is conducted and one or more changes can be made to the original test vector to potentially correct the issue causing the failure. In general, the modification of the original test vector is made manually by a user reviewing the results of the verification. Modifying the original test vector can include, but is not limited to, modifying the inputs that are defined, the outputs that are undefined, the values of defined inputs, the expected value of defined outputs, etc. Some specific example changes to the original test vector are discussed below with respect to FIG. 5G.

In some examples, the method 200 proceeds back to block 202 from block 210 and generates additional extended test vectors based on the modified original test vector. Since the additional test vectors are generated based on the modified original test vector, and relevant requirements for the system under test driving that test vector, the combination of values for at least one of the additional test vectors is different than the combination of values for the extended test vectors generated for the previous execution(s). In such examples, the method 200 proceeds with blocks 204 and 206 using the additional test vectors.

Figure 3:
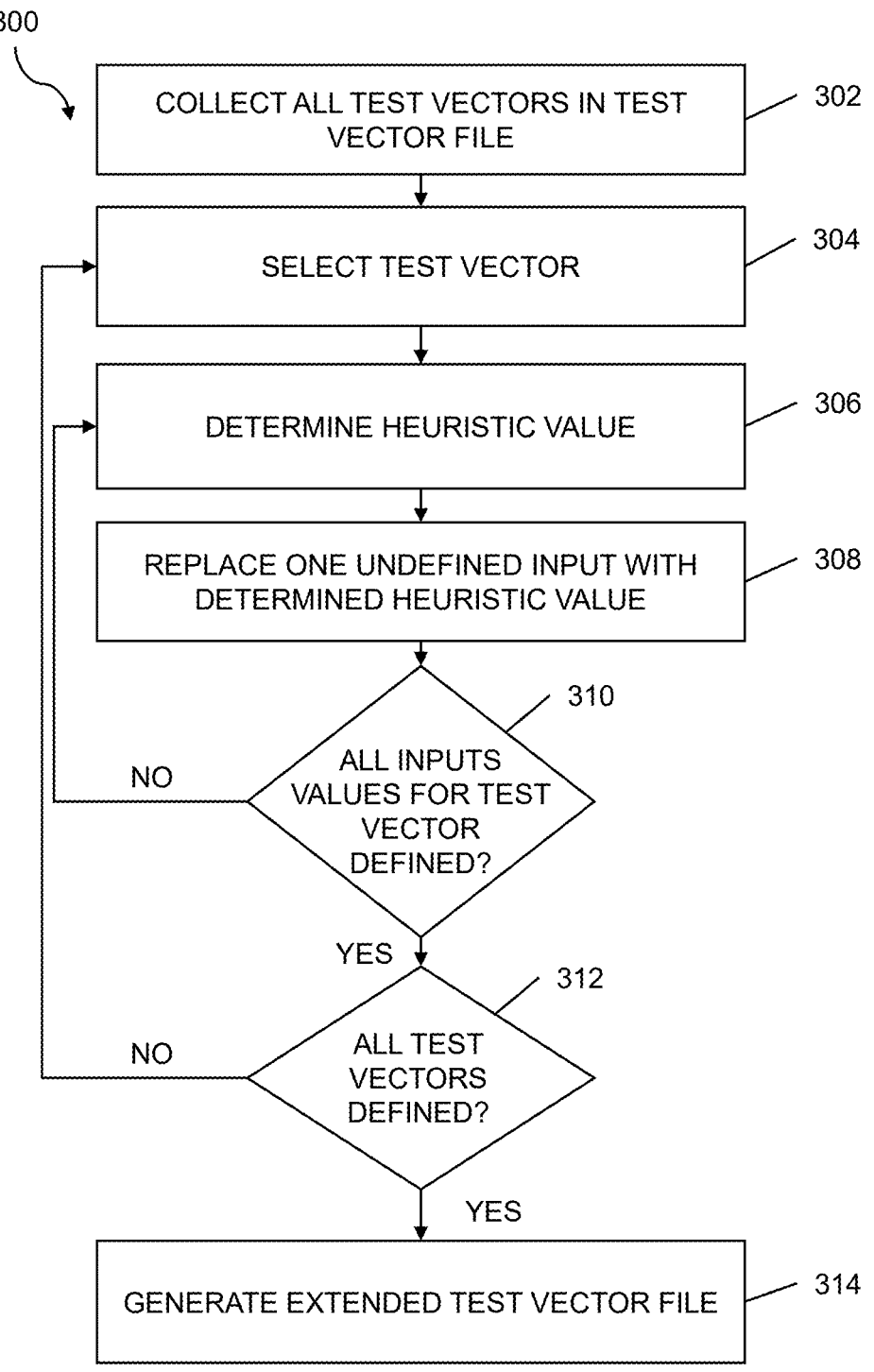
FIG. 3 is a diagram of an example generating extended test vectors.

FIG. 3 illustrates a flow diagram of an example method 300 of generating extended test vectors. The common features discussed above with respect to the example system and method in FIGS. 1-2 can include similar characteristics to those discussed with respect to method 300 and vice versa. In some examples, at least some blocks of the method 300 are performed by the system 100 described above.

The blocks of the flow diagram in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel in an event-driven manner).

The method 300 includes collecting all test vectors in a test vector file (block 302). In some examples, the test vector file includes a single test vector with one or more execution steps. In other examples, the test vector file includes multiple test vectors each with one or more execution steps. The test vector file can be provided by user input that can include, for example, uploading the test vector file via a user interface or manually entering the information about the one or more test vectors for the test vector file.

The method 300 further includes selecting a test vector (block 304). In some examples, selecting a test vector includes selecting the test vector sequentially from a list of test vectors in the test vector file. In other examples, selecting a test vector includes selecting the test vector based on additional information (for example, priority information) in the test vector file.

The method 300 proceeds with determining a heuristic value (block 306) and replacing one undefined input from the test vector with the determined heuristic value (block 308). In some examples, the heuristic value is determined based on a configurable heuristic type and operational range information (for example, range constraints) for the undefined input being replaced by the heuristic value. In some examples, the heuristic type applied for determining the heuristic value is configurable based on user input and can include, but is not limited to, a minimum value of a normal range for each of the undefined inputs, a maximum value of the normal range for each of the undefined inputs, a mid-range value of the normal range for each of the undefined inputs, and/or alternating between a minimum value of the normal range and a maximum value of the normal range for the undefined inputs.

The method 300 further includes determining whether all input values for the extended test vectors for the selected test vector have been defined (block 310). If not, the method 300 proceeds with repeating blocks 306, 308, and 310 until all of the extended test vectors for the selected test vector have been defined.

Once all of the input values for the extended test vectors for the selected test vector have been defined, the method 300 proceeds with determining whether extended test vectors have been defined for all of the test vectors in the test vector file (block 312). If not, the method 300 proceeds back to block 304 to select the next test vector in the text vector file and repeats blocks 306, 308, and 310 for each test vector until all input values for the extended test vectors are defined.

Once all of the extended test vectors have been defined, the method 300 proceeds within generating the extended test vector file (block 314). In some examples, the extended test vector file includes the extended test vectors for each of the test vectors collected at block 302.

In some examples, the test vector file includes only a single test vector. In such examples, at least some of the blocks of the method 300 can be omitted. For example, block 304 and 312 can be omitted if the test vector file includes only a single test vector.

Figure 4A:
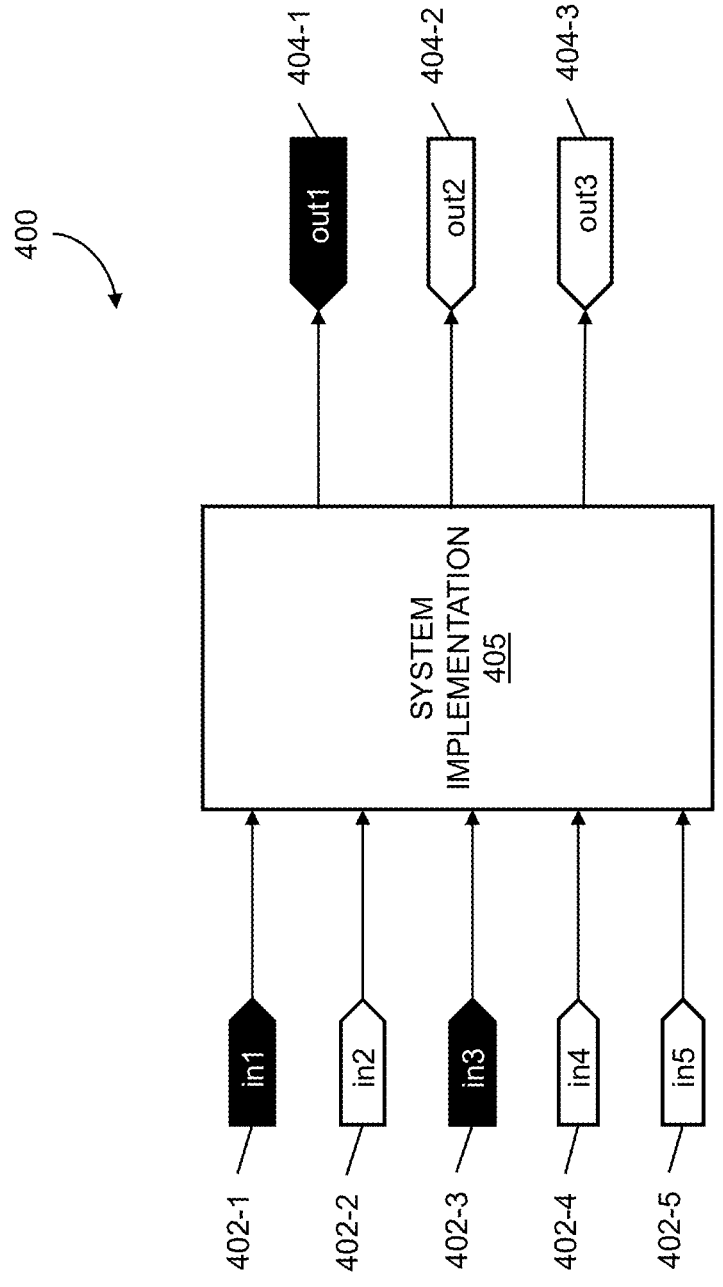
FIG. 4A is a block diagram of an example system under test.

FIG. 4A is a scenario diagram of an example system 400. In the example shown in FIG. 4A, the system 400 has five inputs 402 and three outputs 404. The system 400 also includes a system implementation 405, which includes one or more functions (not shown in FIG. 4A) that are configured to receive the inputs 402 and generate the outputs 404.

FIG. 4B illustrates the original test vector provided for the system 400. As shown in FIG. 4B, the original test vector defines values for the first input 402-1, the third input 402-3, and the first output 404-1, which depends on the first input 402-1 and the third input 402-3. In particular, the original test vector defines that the value of the first input 402-1 is 4, the value of the third input 402-3 is 10, and the expected value of the first output 404-1 is 40. The values of the second input 402-2, the fourth input 402-4, and the fifth input 402-5 are not defined in the test vector shown in FIG. 4B. Further, the second output 404-2 and the third output 404-3 are also not defined in the test vector shown in FIG. 4B.

FIG. 4C is a diagram of a table of the system input/output values when utilizing a current method of test execution, which generates a single set of default/random values for the undefined inputs in the original test vector. As shown in FIG. 4C, the undefined inputs from the original test vector (the second input 402-2, the fourth input 402-4, and the fifth input 402-5) have been assigned values for execution of the system implementation 405 during testing. In particular, the value of the second input 402-2 is set to 0, the value of the fourth input 402-4 is set to 0, and the value of the fifth input 402-5 is set to 10 for the test execution. The generation of the single set of default/random values for the undefined inputs in the original test vector is typically not controlled in a specific way. Rather, these values are randomly allocated and used only as a means to ensure that the system implementation 405 executes for testing.

FIG. 4D is a diagram of a table of the system input/output values when utilizing the extended test vectors for test execution as described herein. As shown in FIG. 4D, four extended test vectors are generated from the original test vector shown in FIG. 4B and each respective row of the table represents a different extended test vector. The undefined inputs from the original test vector (the second input 402-2, the fourth input 402-4, and the fifth input 402-5) have been assigned values for execution of the system implementation 405 during testing. Also, as shown in FIG. 4D, each of the extended test vectors includes a different combination of values for the undefined inputs compared to the other extended test vectors.

In some examples, the different combinations of values for each of the extended test vectors are generated based on different heuristic types. As discussed above, the different heuristic types can include, but are not limited to, a minimum value of a normal range, a maximum value of an operational range, a mid-range value of an operational range (for example, within approximately 10% of the middle value between the minimum and maximum values of the operational range), or combinations of these heuristic types for the different undefined inputs.

In some examples, extended test vectors can be used to catch a discrepancy between a system implementation and a test vector that current methods of test execution fail to catch.

Figure 5A:
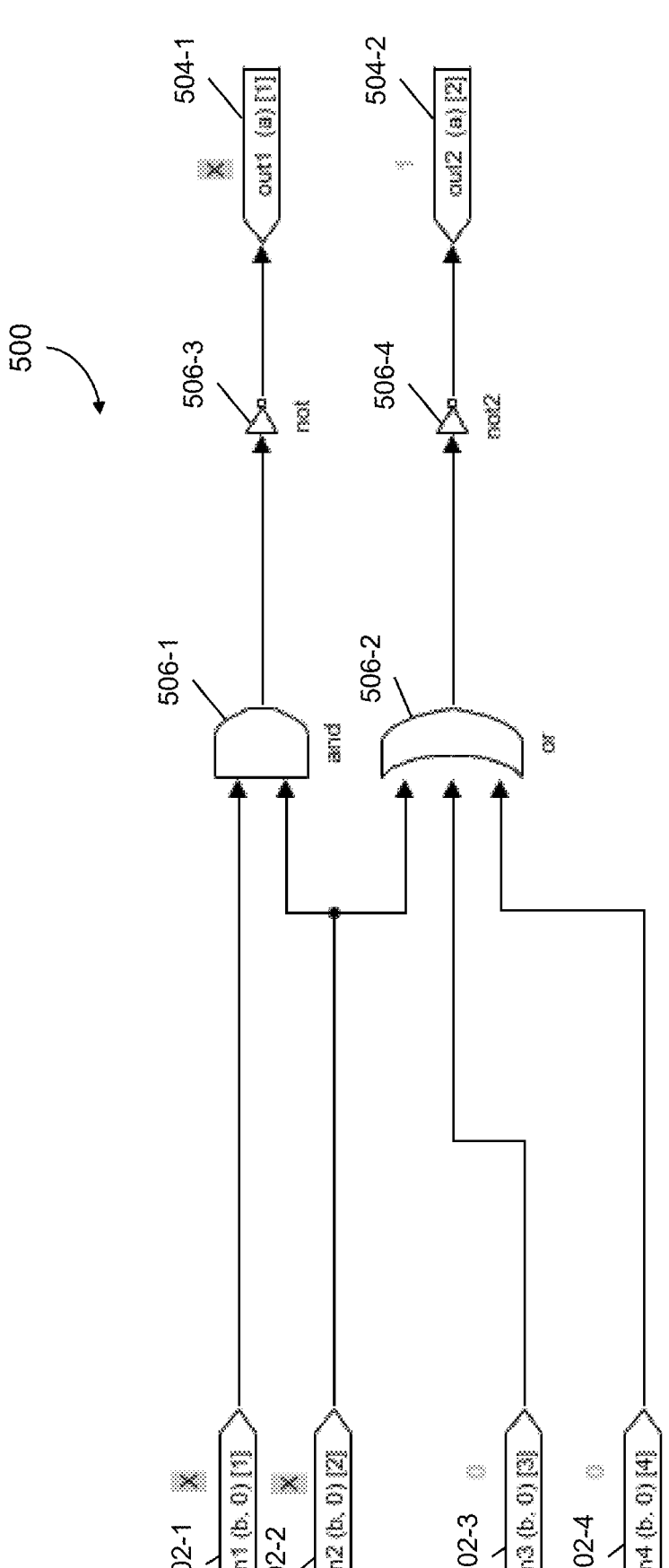
FIG. 5A is a block diagram of an example system under test.

FIG. 5A is a diagram of an example system under test 500 with Boolean functions/operators. In the example shown in FIG. 5A, the system under test 500 has four inputs 502, two outputs 504, and four functions 506. In the example shown in FIG. 5A, the first function 506-1 (and) is configured to receive the first input 502-1 (in1) and the second input 502-2 (in2). The second function 506-2 (or) is configured to receive the second input 502-2, the third input 502-3 (in3), and the fourth input 502-4 (in4). The third function 506-3 (not) is configured to receive the output of the first function 506-1 and then output the inverse of the value of the output of the first function 506-1. The output of the third function 506-3 is the first output 504-1 of the system under test 500. The fourth function 506-4 (not2) is configured to receive the output of the second function 506-2 and then output the inverse of the value of the output of the second function 506-2. The output of the fourth function 506-4 is the second output 504-2 of the system under test 500.

Figures 5B, 5C, 5D:
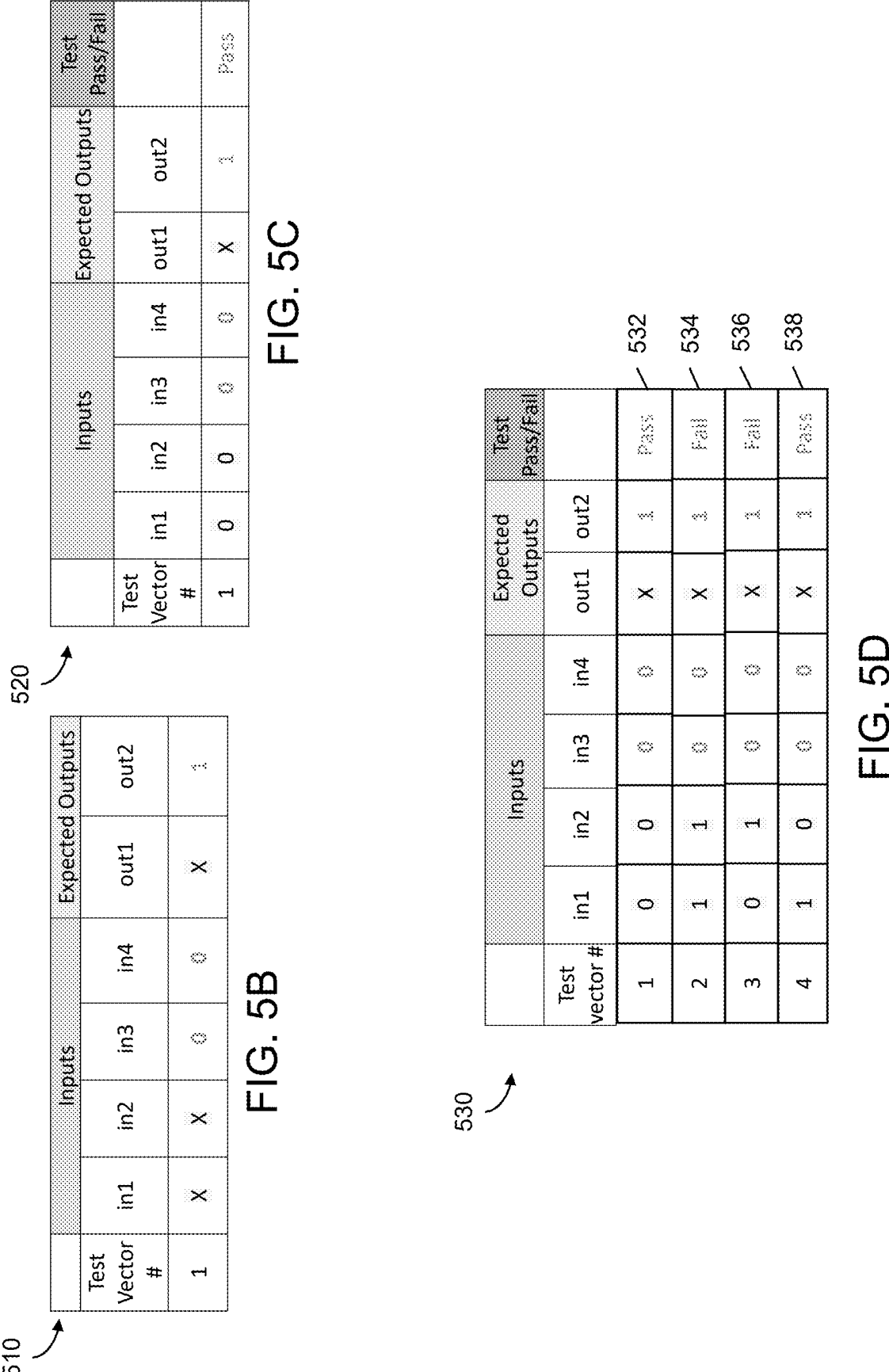
FIG. 5B is a table representing an example test vector for the system in FIG. 5A.
FIG. 5C is a table representing an example execution result for the system in FIG. 5A using a previous test method.
FIG. 5D is a table representing an example execution result for the system in FIG. 5A using the techniques described herein.

FIG. 5B illustrates the original test vector 510 provided for the system under test 500 shown in FIG. 5A. As shown in FIG. 5B, the original test vector defines values for the third input 502-3 and the fourth input 502-4 as well as an expected value for the second output 504-2. In particular, the original test vector defines that the value of the third input 502-3 is 0, the value of the fourth input 502-4 is 0, and the expected value of the second output 504-2 is 1. The values of the first input 502-1 and the second input 502-2 are not defined in the original test vector shown in FIG. 5B. Further, the first output 504-1 is also not defined in the original test vector shown in FIG. 5B.

FIG. 5C is a diagram of a table 520 of the system input/output values when utilizing a current method of test execution as well as a pass/fail indication for the test execution of the system under test 500 using the values shown in FIG. 5C. As shown in FIG. 5C, the undefined inputs from the original test vector (the first input 502-1 and the second input 502-2) have been assigned values for execution of the system under test 500 during testing. In particular, the values of the first input 502-1 and the second input 502-2 are set to 0 for the test execution. In the example shown in FIG. 5C, the result of the test execution of the system under test 500 indicates that the system implementation for the system under test 500 passes and fulfills the requirements of the original test vector. In particular, when the first input 502-1, the second input 502-2, the third input 502-3, and the fourth input 502-4 are set to 0, the output of the second function 506-2 is 0 and the output of the fourth function 506-4 is 1. This matches the expected output value from the original test vector.

However, there is an error in the system implementation for the system under test 500 shown in FIG. 5A because the second output 504-2 cannot be unambiguously derived from only the third input 502-3 and the fourth input 502-4 alone. In particular, the second input 502-2 also has an impact on the second output 504-2 that should not be part of the system implementation for the system under test 500. For example, if the second input 502-2 was set to 1, the system under test 500 would fail because the generated value of the second output 504-2 would be 0 rather than 1 such that the requirements of the test vector would not be fulfilled. The current methods for test execution are likely to miss identification of this error using a single instance of default/random values, so the error is likely to go undetected during testing.

FIG. 5D is a diagram of a table 530 of the system input/output values when utilizing the extended test vectors for test execution as described herein as well as a pass/fail indication for the test execution of the system under test 500 using the values shown in FIG. 5D. As shown in FIG. 5D, four extended test vectors are generated from the original test vector shown in FIG. 5B and each respective row of the table represents a different extended test vector. The undefined inputs from the original test vector (the first input 502-1 and the second input 502-2) have been assigned values for execution of the system under test 500 during testing. In some examples, the assigned values for the execution of the system under test 500 are generated using the techniques described above with respect to FIGS. 1-3.

For the first extended test vector, the values of the first input 502-1 and the second input 502-2 are set to 0 for the test execution. This is the same as in the test vector shown in FIG. 5C. As indicated at 532, the result of the test execution of the system under test 500 indicates that the system implementation for the system under test 500 passes and fulfills the requirements of the test vector because the value of the second output 504-2 will be 1 when the input values are set as shown for the first extended test vector. This matches the expected value of 1 for the second output 504-2 from the original test vector.

For the second extended test vector, the value of the first input 502-1 is set to 1, and the value of the second input 502-2 is set to 1 for the test execution. As indicated at 534, the result of the test execution of the system under test 500 indicates that the system implementation for the system under test 500 fails because it does not fulfill the requirements of the test vector. In particular, the second extended test vector fails because the second output 504-2 will be 0 when the values are set as shown for the second extended test vector. This does not match the expected value of 1 for the second output 504-2 from the original test vector.

For the third extended test vector, the value of the first input 502-1 is set to 0, and the value of the second input 502-2 is set to 1 for the test execution. As indicated at 536, the result of the test execution of the system under test 500 indicates that the system implementation for the system under test 500 fails because it does not fulfill the requirements of the test vector. In particular, the third extended test vector fails because the second output 504-2 will be 0 when the values are set as shown for the second extended test vector. This does not match the expected value of 1 for the second output 504-2 from the original test vector.

For the fourth extended test vector, the value of the first input 502-1 is set to 1, and the value of the second input 502-2 is set to 0 for the test execution. As indicated at 538, the result of the test execution of the system under test 500 indicates that the system implementation for the system under test 500 passes because it does not fulfill the requirements of the test vector. In particular, the fourth extended test vector passes and fulfills the requirements of the test vector because the second output 504-2 will be 1 when the values are set as shown for the fourth extended test vector, which matches the expected value of 1 from the original test vector.

Based on the failure of the second and third extended test vectors during the test execution of the system under test 500, it is clear that updates are needed. An extended test vector fails due to the implementation of the system under test 500 being incorrect and/or the original test vector being incorrect. Therefore, in order for all of the extended test vectors to pass the requirements, updates need to be made to the implementation of the system under test 500 and/or the original test vector used to generate the extended test vectors.

Figure 5E:
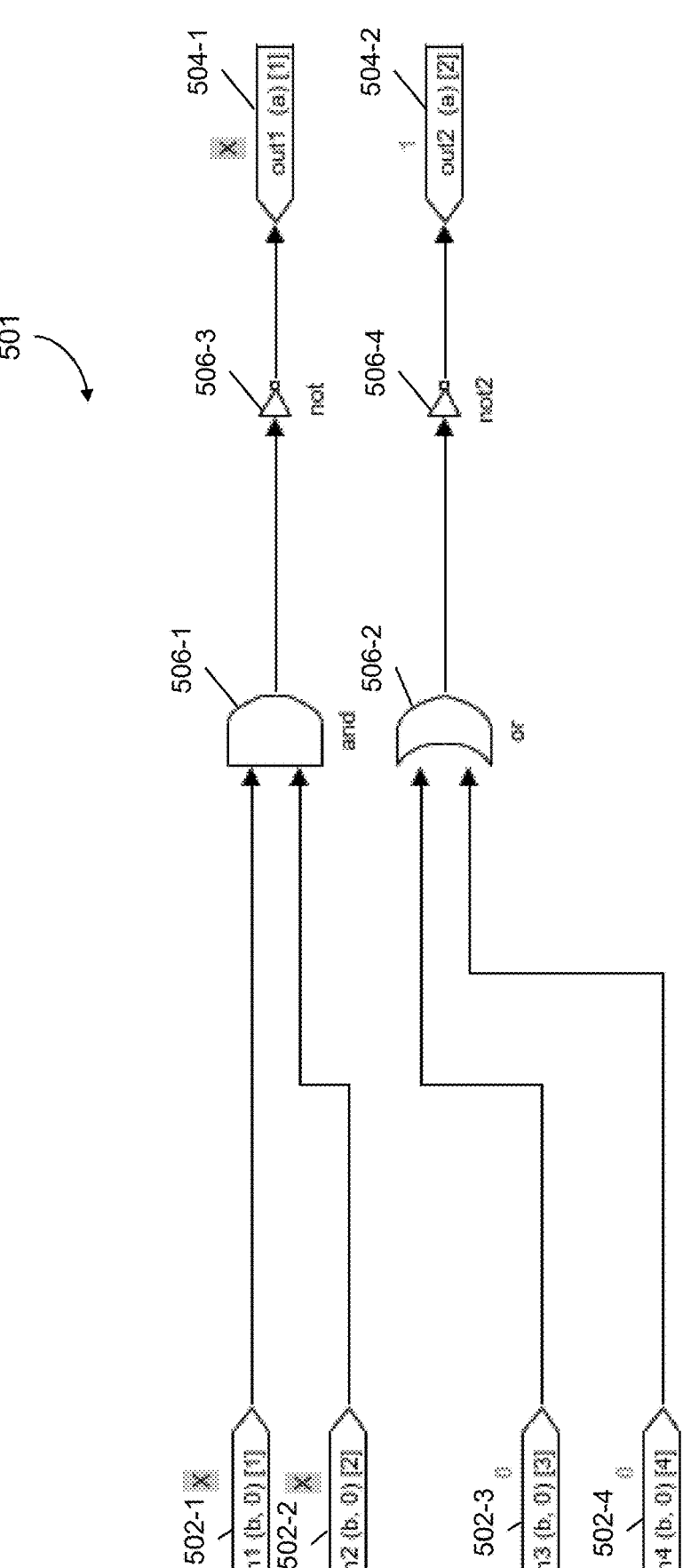
FIG. 5E is a block diagram of a modified version of the example system in FIG. 5A.

FIG. 5E is a diagram of a system under test 501, which is a modified implementation of the system under test 500. The only difference between the system under test 500 and the system under test 501 is where the second input 502-2 is provided. In particular, the second input 502-2 in the system under test 501 is only provided to the second function 506-2 whereas the second input 502-2 is provided to both the first function 506-1 and the second function 506-2 in the system under test 500. The modification reflected in the system under test 501 removes the dependency of the second output 504-2 on the second input 502-2.

FIG. 5F is a diagram of a table 540 of the system input/output values when utilizing the extended test vectors for test execution as described herein as well as a pass/fail indication for the test execution of the system under test 501 using the values shown in FIG. 5F. As shown in FIG. 5F, the four extended test vectors correspond to the extended test vectors shown in FIG. 5D, so the original test vector has not been updated. However, as shown at 542, 544, 546, 548, each of the extended test vectors passes and fulfills the requirements of the original test vector because the value of the second output 504-2 for each test vector will be 1 when the values are set as shown in FIG. 5F. Thus, the updates to the implementation of system under test 500 reflected in the system under test 501 shown in FIG. 5E resolved the errors detected through the execution of the extended test vectors.

As discussed above, the original test vector can also be updated in addition to, or instead of, updating the implementation of the system under test. FIG. 5G is a diagram of a table 550 of the system input/output values when utilizing the extended test vectors for test execution as described herein as well as a pass/fail indication for the test execution of the system under test 500 using the values shown in FIG. 5G. In the example shown in FIG. 5G, the original test vector has been updated for the system under test 500 shown in FIG. 5A rather than updating the implementation of the system under test 500. In particular, the original test vector has been modified such that the second input 502-2 is also defined to have a value of 0.

As shown in FIG. 5G, two extended test vectors are generated from the original test vector and each respective row of the table represents a different extended test vector. The undefined input from the original test vector (the first input 502-1) has been assigned values for execution of the system under test 500 during testing. In some examples, the assigned values for the execution of the system under test 500 are generated using the techniques described above with respect to FIGS. 1-3. As shown at 552, 554, each of the extended test vectors passes and fulfills the requirements of the original test vector because the value of the second output 504-2 for each test vector will be 1 when the values are set as shown in FIG. 5G. Thus, the updates to the original test vector reflected in the table 550 shown in FIG. 5G resolved the errors detected through the execution of the extended test vectors.

In some examples, extended test vectors can be used to determine the partial computations for a system with different types of non-Boolean functions/operators (for example, numeric and mathematical operations.

Figure 6A:
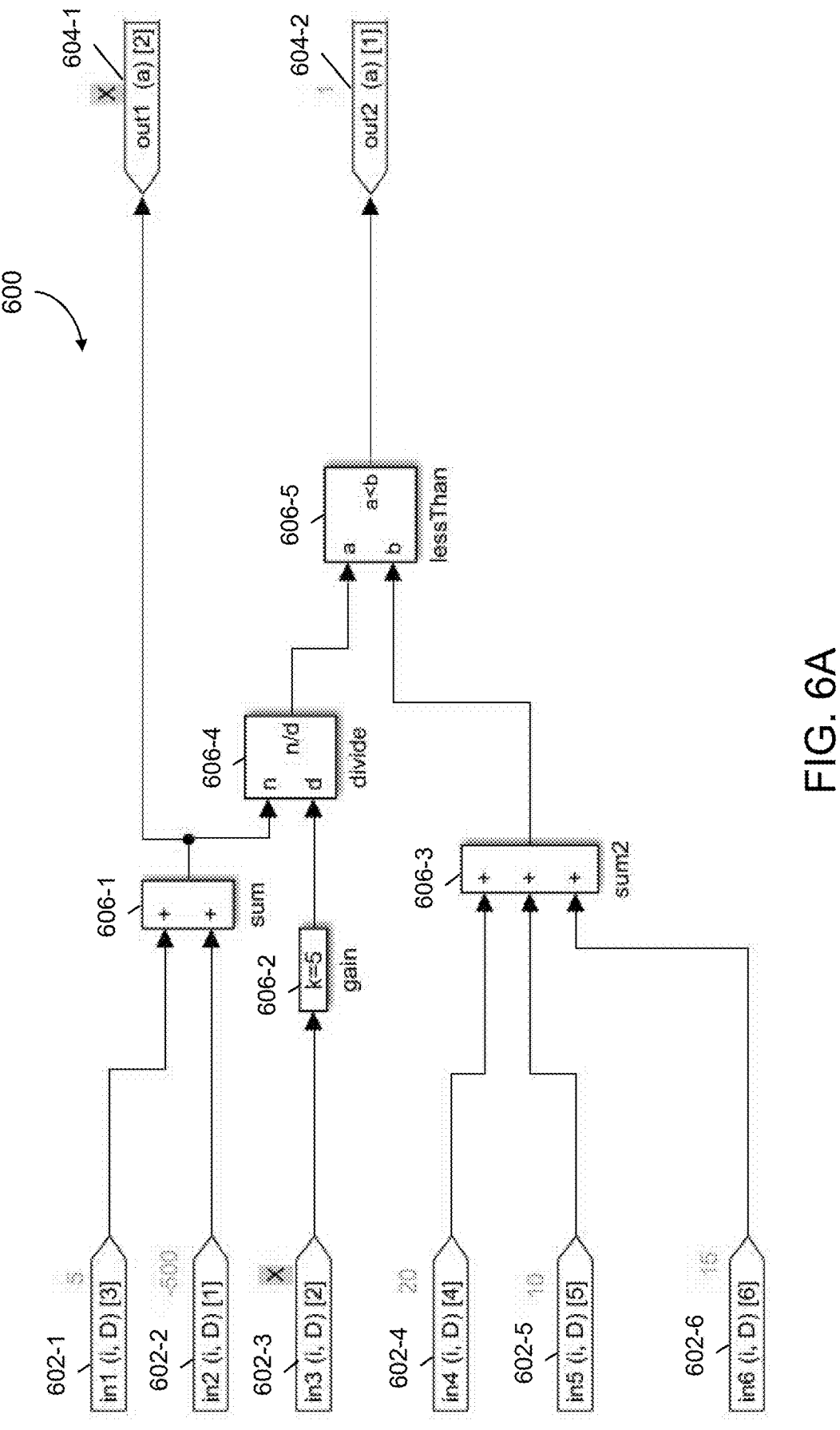
FIG. 6A is a block diagram of an example system under test.

FIG. 6A is a diagram of an example system under test 600 with non-Boolean functions/operators. In the example shown in FIG. 6A, the system under test 600 has six inputs 602, two outputs 604, and six functions 606. In the example shown in FIG. 6A, the first function 606-1 (sum) is configured to receive the first input 602-1 (in1) and the second input 602-2 (in2) and then output the sum of the first input 602-1 and the second input 602-2. The output of the first function 606-1 is the first output 604-1 of the system under test 600. The second function 606-2 (gain) is configured to receive the third input 602-3 (in3) and then output a value that is five times the value of the third input 602-3. The third function 606-3 (sum2) is configured to receive the fourth input 602-4 (in4), the fifth input 602-5 (in5), and the sixth input 602-6 (in6) and then output the sum of the fourth input 602-4, the fifth input 602-5, and the sixth input 602-6. The fourth function 606-4 (divide) is configured to receive the output of the first function 606-1 and the output of the second function 606-2, divide the output of the first function 606-1 by the output of the second function 606-2, and output that value. The fifth function 606-5 (lessThan) is configured to receive the output of the fourth function 606-4 (*a*) and the output of the third function 606-3 (*b*). The fifth function 606-5 is configured to determine whether a is less than b and generate an output based on the determination. The output of the fifth function 606-5 is the second output 604-2 of the system under test 600.

FIG. 6B illustrates the original test vector provided for the system under test 600 shown in FIG. 6A. As shown in FIG. 6B, the original test vector defines values for the first input 602-1, the second input 602-2, the fourth input 602-4, the fifth input 602-5, and the sixth input 602-6 as well as the expected value for the second output 604-2. In particular, the original test vector defines that the value of the first input 602-1 is 5, the value of the second input 602-2 is −500, the value of the fourth input 602-4 is 20, the value of the fifth input 602-5 is 10, the value of the sixth input 602-6 is 15, and the expected value of the second output 604-2 is 1. The value of the third input 602-3 is not defined in the original test vector shown in FIG. 6B. Further, the first output 604-1 is also not defined in the original test vector shown in FIG. 6B.

FIG. 6C is a diagram of a table 620 of the system input/output values when utilizing a current method of test execution as well as a pass/fail indication for the test execution of the system under test 600 using the values shown in FIG. 6C. As shown in FIG. 6C, the undefined input from the original test vector (the third input 602-3) has been assigned a value for execution of the system under test 600 during testing. In particular, the value of the third input 602-3 is set to 1 for the test execution. In the example shown in FIG. 6C, the result of the test execution of the system under test 600 indicates that the system implementation for the system under test 600 passes and fulfills the requirements of the original test vector. In particular, when the first input 602-1, the second input 602-2, the fourth input 602-4, the fifth input 602-5, and the sixth input 602-6 are set to the defined values and the third input 602-3 is set to 1, the output of the fifth function 606-5 is 1. This matches the expected output value from the original test vector.

However, there is an error in the system implementation for the system under test 600 because the second output 604-2 cannot be unambiguously derived from only the first input 602-1, the second input 602-2, the fourth input 602-4, the fifth input 602-5, and the sixth input 602-6. In particular, the third input 602-3 also has an impact on the second output 604-2 that should not be part of the system implementation for the system under test 600 because if the third input 602-3 was set to a range of other values, the system under test 600 would fail because the generated value of the second output 604-2 would be 0 rather than 1 such that the requirements of the original test vector would not be fulfilled. The current methods for test execution are likely to miss identification of this error using a single instance of default/random values, so the error is likely to go undetected during testing.

FIG. 6D is a diagram of a table 630 of the system input/output values when utilizing the extended test vectors for test execution as described herein. As shown in FIG. 6D, seven extended test vectors are generated from the original test vector shown in FIG. 6B and each respective row of the table represents a different extended test vector. The undefined input from the original test vector (the third input 602-3) has been assigned values for execution of the system under test 600 during testing. In some examples, the assigned values for the execution of the system under test 600 are generated using the techniques described above with respect to FIGS. 1-3.

For the first extended test vector, the value of the third input 602-3 is set to 1 for the test execution. This is the same as in the test vector shown in FIG. 6C. As indicated at 631, the result of the test execution of the system under test 600 indicates that the system implementation for the system under test 600 passes and fulfills the requirements of the test vector because the second output 604-2 will be 1 when the input values are set as shown for the first extended test vector. This matches the expected value of 1 for the second output 604-2 from the original test vector.

For the second extended test vector, the value of the third input 602-3 is set to 1000 for the test execution. As indicated at 632, the result of the test execution of the system under test 600 indicates that the system implementation for the system under test 600 passes and fulfills the requirements of the test vector because the second output 604-2 will be 1 when the input values are set as shown for the second extended test vector. This matches the expected value of 1 for the second output 604-2 from the original test vector.

For the third extended test vector, the value of the third input 602-3 is set to 100 for the test execution. As indicated at 633, the result of the test execution of the system under test 600 indicates that the system implementation for the system under test 600 passes and fulfills the requirements of the test vector because the second output 604-2 will be 1 when the input values are set as shown for the third extended test vector. This matches the expected value of 1 for the second output 604-2 from the original test vector.

For the fourth extended test vector, the value of the third input 602-3 is set to negative 1000 for the test execution. As indicated at 634, the result of the test execution of the system under test 600 indicates that the system implementation for the system under test 600 passes and fulfills the requirements of the test vector because the second output 604-2 will be 1 when the input values are set as shown for the third extended test vector. This matches the expected value of 1 for the second output 604-2 from the original test vector.

For the fifth extended test vector, the value of the third input 602-3 is set to negative 100 for the test execution. As indicated at 635, the result of the test execution of the system under test 600 indicates that the system implementation for the system under test 600 passes and fulfills the requirements of the test vector because the second output 604-2 will be 1 when the input values are set as shown for the fifth extended test vector. This matches the expected value of 1 for the second output 604-2 from the original test vector.

For the sixth extended test vector, the value of the third input 602-3 is set to −10 for the test execution. As indicated at 636, the result of the test execution of the system under test 600 indicates that the system implementation for the system under test 600 passes and fulfills the requirements of the test vector because the second output 604-2 will be 1 when the input values are set as shown for the sixth extended test vector. This matches the expected value of 1 for the second output 604-2 from the original test vector.

For the seventh extended test vector, the value of the third input 602-3 is set to −1 for the test execution. As indicated at 637, the result of the test execution of the system under test 600 indicates that the system implementation for the system under test 600 fails because it does not fulfill the requirements of the test vector. In particular, the seventh extended test vector fails because the second output 604-2 will be 0 when the values are set as shown for the seventh extended test vector. This does not match the expected value of 1 for the second output 604-2 from the original test vector.

Based on the failure of the seventh extended test vector during the test execution of the system under test 600, it is clear that updates are needed. An extended test vector fails due to the implementation of the system under test 600 being incorrect and/or the original test vector being incorrect. Therefore, in order for all of the extended test vectors to pass the requirements, updates need to be made to the implementation of the system under test 600 and/or the original test vector used to generate the extended test vectors.

Figure 6E:
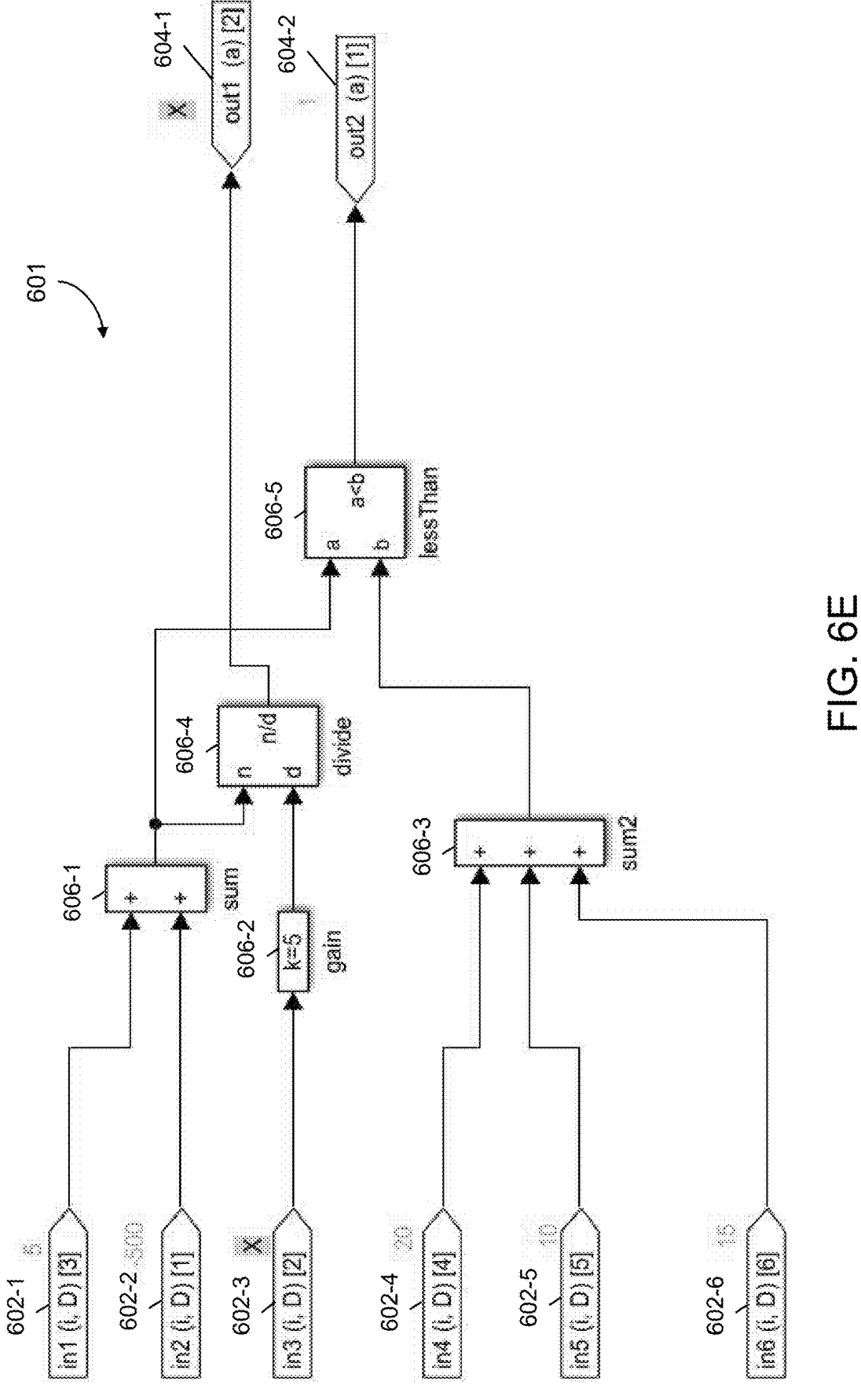
FIG. 6E is a block diagram of a modified version of the example system in FIG. 6A.

FIG. 6E is a diagram of a system under test 601, which is a modified implementation of the system under test 600. The differences between the system under test 600 and the system under test 601 include where the output of the first function 606-1 is provided and where the output of the fourth function 606-4 is provided. In particular, the output of the first function 606-1 is provided to the fourth function 606-4 and the fifth function 606-5 in the system under test 601. However, the output of the first function 606-1 is no longer the first output 604-1 of the system under test 601. Further, the output of the fourth function 606-4 is no longer provided to the fifth function 606-5 and instead is the first output 604-1 of the system under test 601. The modification reflected in the system under test 601 removes the dependency of the second output 504-2 on the third input 602-3.

FIG. 6F is a diagram of a table 640 of the system input/output values when utilizing the extended test vectors for test execution as described herein as well as a pass/fail indication for the test execution of the system under test 601 using the values shown in FIG. 6F. As shown in FIG. 6F, the seven extended test vectors correspond to the extended test vectors shown in FIG. 6D, so the original test vector has not been updated. However, as shown at 641, 642, 643, 644, 645, 646, 647, each of the extended test vectors passes and fulfills the requirements of the original test vector because the value of the second output 604-2 for each test vector will be 1 when the values are set as shown in FIG. 6F. Thus, the updates to the implementation of system under test 600 reflected in the system under test 601 shown in FIG. 6E resolved the errors detected through the execution of the extended test vectors.

Figure 7A:
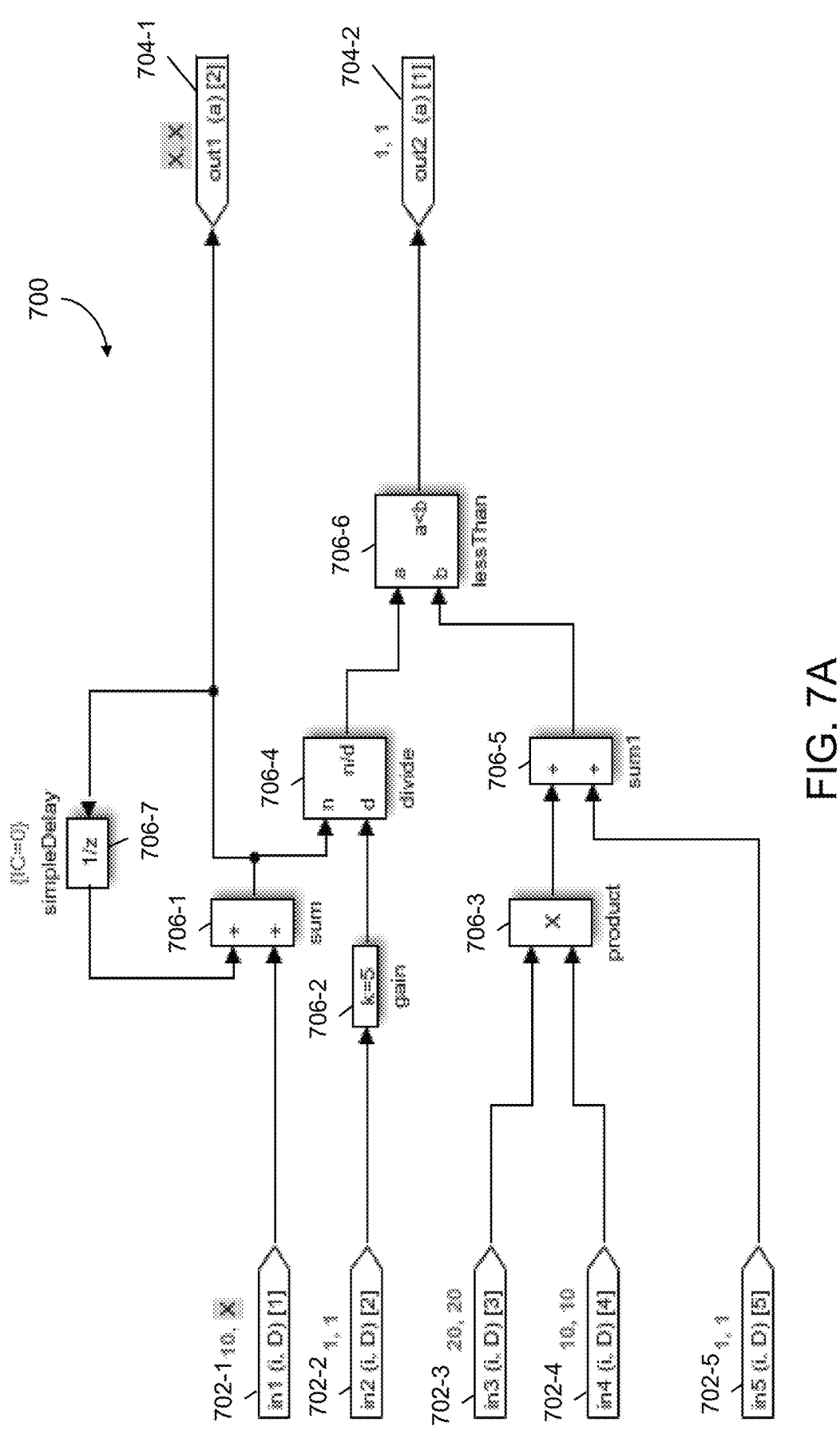
FIG. 7A is a block diagram of an example system under test.

In some examples, extended test vectors can be used to determine the output computations for a system with a combination of different types of time dependent functions/operators. FIG. 7A is a diagram of an example system under test 700 with non-Boolean functions/operators.

In the example shown in FIG. 7A, the system under test 700 has five inputs 702, two outputs 704, and seven functions 706. In the example shown in FIG. 7A, the first function 706-1 (sum) is configured to receive the first input 702-1 (in1) and the output of the seventh function 706-7 (simpleDelay) discussed further below. The first function 706-1 is configured to output the sum of the first input 702-1 output of the seventh function 706-7, and the output of the first function 706-1 is the first output 704-1 of the system under test 700. The second function 706-2 (gain) is configured to receive the second input 702-2 (in2) and then output a value that is five times the value of the second input 702-2. The third function 706-3 (product) is configured to receive the third input 702-3 (in3) and the fourth input 702-4 (in4) and then output the product of the third input 702-3 and the fourth input 702-4. The fourth function 706-4 (divide) is configured to receive the output of the first function 706-1 and the output of the second function 706-2, divide the output of the first function 706-1 by the output of the second function 706-2, and output that value. The fifth function 706-5 (sum1) is configured to receive the output of the third function 706-3 and the fifth input 702-5 (in5) and then output the sum of the output of the third function 706-3 and the fifth input 702-5. The sixth function 706-6 (lessThan) is configured to receive the output of the fourth function 706-4 (a) and the output of the fifth function 706-5 (b). The sixth function 706-6 is configured to determine whether a is less than b and generate an output based on the determination. The output of the sixth function 706-6 is the second output 704-2 of the system under test 700. The seventh function 706-7 is configured to receive the output of the first function 706-1 and provide that value back to the first function 706-1 after a delay.

FIG. 7B illustrates the original test vector provided for the system under test 700 shown in FIG. 7A, which is designed to test time-dependent functionality of the system under test 700. As shown in FIG. 7B, the original test vector includes two execution steps that vary in the values that are defined.

The first execution step defines values for the first input 702-1, the second input 702-2, the third input 702-3, the fourth input 702-4, and the fifth input 702-5 as well as an expected value for the second output 704-2. In particular, for the first execution step, the original test vector defines that the value of the first input 702-1 is 10, the value of the second input 702-2 is 1, the value of the third input 702-3 is 20, the value of the fourth input 702-4 is 10, the value of the fifth input 702-5 is 15, and the expected value of the second output 704-2 is 1. Thus, each of the inputs 702 is defined in the first execution step of the original test vector shown in FIG. 7B, but the first output 704-1 is not defined.

For the second execution step, the original test vector defines values for the second input 702-2, the third input 702-3, the fourth input 702-4, and the fifth input 702-5 as well as an expected value for the second output 704-2. In particular, for the first execution step, the original test vector defines that the value of the second input 702-2 is 1, the value of the third input 702-3 is 20, the value of the fourth input 702-4 is 10, the value of the fifth input 702-5 is 15, and the expected value of the second output 704-2 is 1. The value of the first input 702-1 and the first output 704-1 are both undefined in the second execution step of the original test vector shown in FIG. 7B.

FIG. 7C is a diagram of a table of the system input/output values when utilizing a current method of test execution as well as a pass/fail indication for the test execution of the system under test 700 using the values shown in FIG. 7C. As shown in FIG. 7C, the undefined input from the second execution step of the original test vector (the first input 702-1) has been assigned a value for execution of the system under test 700 during testing. In particular, the value of the first input 702-1 is set to 10 for the test execution. The result of the test execution of the system under test 700 indicates that the system implementation for the system under test 700 passes and fulfills the requirements of both execution steps of the test vector. In particular, when the inputs 702 are set to the values shown for the execution steps in FIG. 7C, the output of the sixth function 706-6 is 1 for both execution steps. This matches the expected output value from the original test vector.

However, there is an error in the system implementation for the system under test 700 because the value of the first input 702-1 has an impact on the second output 704-2 that should not be part of the system implementation for the system under test 700. For example, if the first input 702-1 was set to a range of other values for the second execution step, the system under test 700 would fail because the generated value of the second output 704-2 would be 0 rather than 1 such that the requirements of the original test vector would not be fulfilled. The current methods for test execution are likely to miss identification of this error using a single instance of default/random values, so the error is likely to go undetected during testing.

FIG. 7D is a diagram of a table of the system input/output values when utilizing the extended test vectors for test execution as described herein. As shown in FIG. 7D, three extended test vectors with two execution steps are generated from the original test vector shown in FIG. 7B and each respective row of the table for the respective test vector represents a different execution step. The values of all inputs 702 are defined in the first execution step, so the first execution step for each of the extended test vectors is the same. The undefined input from the second execution step of the original test vector (the first input 702-1) has been assigned values for execution of the system under test 700 during testing.

For the first extended test vector, the value of the first input 702-1 is set to 10 for the test execution. This is the same as in the test vector shown in FIG. 7C. As indicated at 731 and 732, the result of the test execution of the system under test 700 indicates that the system implementation for the system under test 700 passes and fulfills the requirements of the test vector because the second output 704-2 will be 1 when the input values are set as shown for the first extended test vector. This matches the expected value of 1 for the second output 704-2 from the original test vector.

For the second extended test vector, the value of the first input 702-1 is set to 100 for the test execution. As indicated at 733 and 734, the result of the test execution of the system under test 700 indicates that the system implementation for the system under test 700 passes and fulfills the requirements of the test vector because the second output 704-2 will be 1 when the input values are set as shown for the second extended test vector. This matches the expected value of 1 for the second output 704-2 from the original test vector.

For the third extended test vector, the value of the first input 702-1 is set to 1000 for the test execution. As indicated at 735, the result of the test execution of the system under test 700 indicates that the system implementation for the system under test 700 passes and fulfills the requirements of the test vector because the second output 704-2 will be 1 when the input values are set as shown for the first execution step of the third extended test vector. This matches the expected value of 1 for the second output 704-2 from the original test vector. However, as indicated at 736, the result of the test execution of the system under test 700 indicates that the system implementation for the system under test 700 fails because the second output 704-2 will be 0 when the values are set as shown for the second execution step of the third extended test vector. This does not match the expected value of 1 for the second output 704-2 from the original test vector.

Based on the failure of the second execution step of the third extended test vector during the test execution of the system under test 700, it is clear that updates are needed. An extended test vector fails due to the implementation of the system under test 700 being incorrect and/or the original test vector being incorrect. Therefore, in order for all of the extended test vectors to pass the requirements, updates need to be made to the implementation of the system under test 700 and/or the original test vector used to generate the extended test vectors.

Figure 8A:
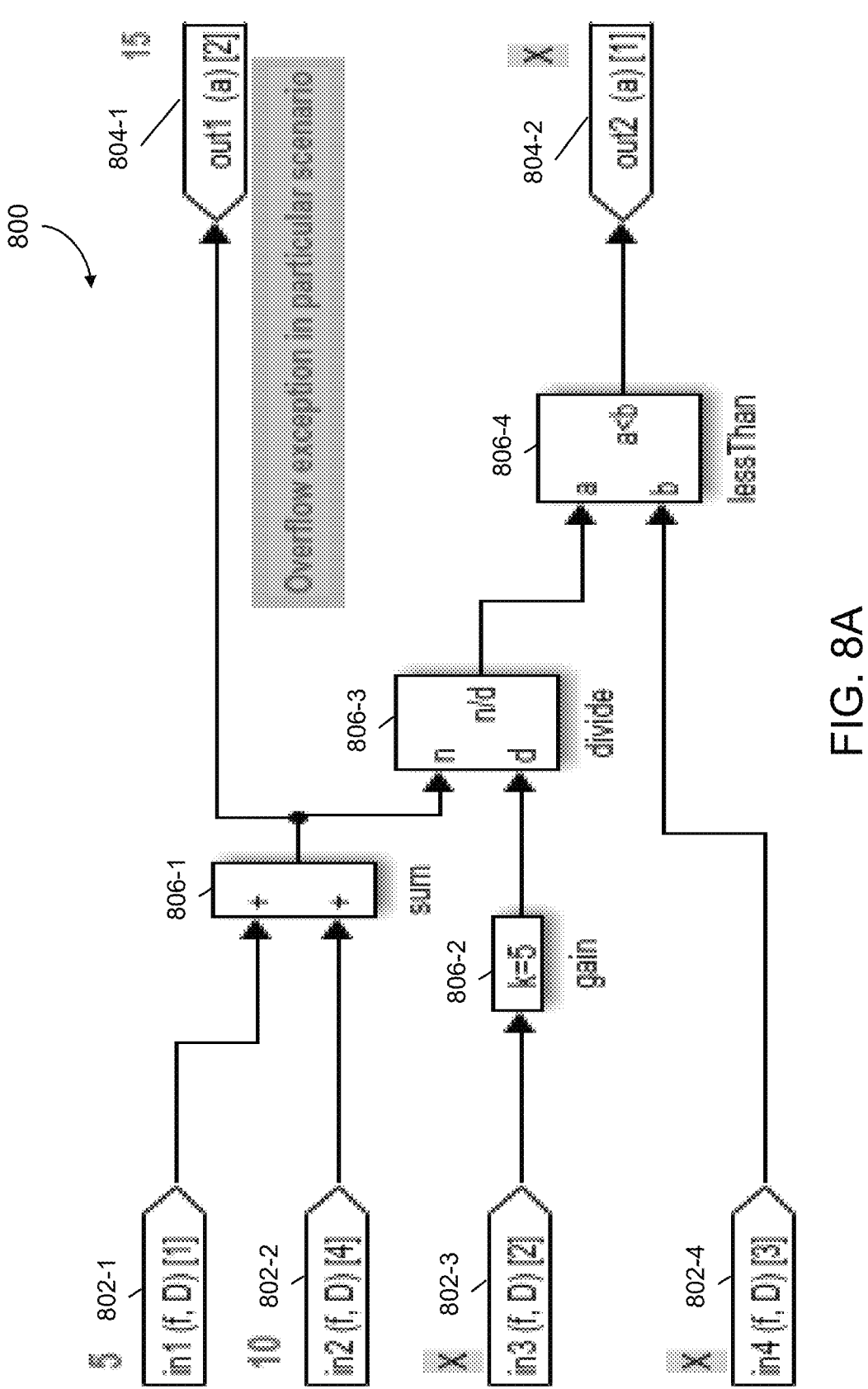
FIG. 8A is a block diagram of an example system under test.

In some examples, extended test vectors can be used to detect exceptions the in the design of a system. FIG. 8A is a diagram of an example system under test 800. In the example shown in FIG. 8A, the system under test 800 has four inputs 802, two outputs 804, and four functions 806.

In the example shown in FIG. 8A, the first function 806-1 (sum) is configured to receive the first input 802-1 (in1) and the second input 802-2 (in2) and then output the sum of the first input 802-1 and the second input 802-2. The output of the first function 806-1 is the first output 804-1 of the system under test 800. The second function 806-2 (gain) is configured to receive the third input 802-3 (in3) and then output a value that is five times the value of the third input 802-3. The third function 806-3 (divide) is configured to receive the output of the first function 806-1 and the output of the second function 806-2, divide the output of the first function 806-1 by the output of the second function 806-2, and output that value. The fourth function 806-4 (lessThan) is configured to receive the output of the third function 806-3 (a) and the fourth input 802-4 (in4; b). The fourth function 806-4 is configured to determine whether a is less than b and generate an output based on the determination. The output of the fourth function 806-4 is the second output 804-2 of the system under test 800.

FIG. 8B illustrates the original test vector provided for the system under test 800 shown in FIG. 8A. As shown in FIG. 8B, the original test vector defines values for the first input 802-1 as well as an expected value for the second input 802-2. In particular, the original test vector defines that the value of the first input 802-1 is 5, the value of the second input 802-2 is 10, and the expected value of the first output 804-1 is 1. The values of the third input 802-3 and the fourth input 802-4 are not defined in the original test vector shown in FIG. 8B. Further, the second output 804-2 is also not defined in the original test vector shown in FIG. 8B.

FIG. 8C is a diagram of a table of the system input/output values when utilizing a current method of test execution as well as a pass/fail indication for the test execution of the system under test 800 using the values shown in FIG. 8C. As shown in FIG. 8C, the undefined inputs from the original test vector (the third input 802-3 and the fourth input 802-4) have been assigned a value for execution of the system under test 800 during testing. In particular, the value of the third input 802-3 and the fourth input 802-4 are set to 1 for the test execution. The result of the test execution of the system under test 800 indicates that the system implementation for the system under test 800 passes and fulfills the requirements of the test vector. In particular, when the first input 802-1 and the second input 802-2 are set to the defined values, the third input 802-3 is set to 1, and the fourth input 802-4 is set to 1, the output of the fourth function 806-4 and the second output 804-2 of the system under test 800 is 15. This matches the expected output value from the original test vector.

However, there is an error in the system implementation for the system under test 800 because an overflow exception occurs under particular conditions. For example, an overflow exception occurs if the fourth input 802-4 is set to 0. The current methods for test execution are likely to miss identification of this error using a single instance of default/random values, so the error is likely to go undetected during testing.

FIG. 8D is a diagram of a table of the system input/output values when utilizing the extended test vectors for test execution as described herein. As shown in FIG. 8D, five extended test vectors are generated from the original test vector shown in FIG. 8B and each respective row of the table represents a different extended test vector. The undefined inputs from the original test vector (the third input 802-3 and the fourth input 802-4) have been assigned values for execution of the system under test 800 during testing.

For the first extended test vector, the value of the third input 802-3 is set to 1000 and the fourth input 802-4 is set to 1 for the test execution. As indicated at 831, the result of the test execution of the system under test 800 indicates that the system implementation for the system under test 800 passes and fulfills the requirements of the test vector because the first output 804-1 will be 15 when the input values are set as shown for the first extended test vector. This matches the expected value of 15 for the first output 804-1 from the original test vector.

For the second extended test vector, the value of the third input 802-3 is set to 100 and the fourth input 802-4 is set to 1 for the test execution. As indicated at 832, the result of the test execution of the system under test 800 indicates that the system implementation for the system under test 800 passes and fulfills the requirements of the test vector because the first output 804-1 will be 15 when the input values are set as shown for the second extended test vector. This matches the expected value of 15 for the first output 804-1 from the original test vector.

For the third extended test vector, the value of the third input 802-3 is set to −1000 and the fourth input 802-4 is set to 1 for the test execution. As indicated at 833, the result of the test execution of the system under test 800 indicates that the system implementation for the system under test 800 passes and fulfills the requirements of the test vector because the first output 804-1 will be 15 when the input values are set as shown for the first extended test vector. This matches the expected value of 15 for the first output 804-1 from the original test vector.

For the fourth extended test vector, the value of the third input 802-3 is set to −100 and the fourth input 802-4 is set to 1 for the test execution. As indicated at 834, the result of the test execution of the system under test 800 indicates that the system implementation for the system under test 800 passes and fulfills the requirements of the test vector because the first output 804-1 will be 15 when the input values are set as shown for the first extended test vector. This matches the expected value of 15 for the first output 804-1 from the original test vector.

For the fifth extended test vector, the value of the third input 802-3 is set to 0 and the fourth input 802-4 is set to 1 for the test execution. As indicated at 835, the result of the test execution of the system under test 800 indicates that the system implementation for the system under test 800 fails because it does not fulfill the requirements of the test vector. In particular, the fifth extended test vector fails because there is an overflow exception since the output of the third function 806-3 cannot be determined due to dividing by 0.

Based on the failure of the fifth extended test vector during the test execution of the system under test 800, it is clear that updates are needed. An extended test vector fails due to the implementation of the system under test 800 being incorrect and/or the original test vector being incorrect. Therefore, in order for all of the extended test vectors to pass the requirements, updates need to be made to the implementation of the system under test 800 and/or the original test vector used to generate the extended test vectors. In this situation, the analysis of the exception (overflow or otherwise) is quicker using the techniques described herein because only an undefined input will cause the exception and the assigned values of the fourth input 802-4 are consistent for all of the extended test vectors. Thus, it is clear that the exception is likely caused by the third input 802-3.

By using the techniques described herein, the quality of system testing and confidence that actual system outputs are calculated only from inputs defined in the test case corresponding to a specific requirement is increased. In particular, the techniques described herein provide further verification compared to current methods that the system outputs are not calculated or impacted by undefined inputs when default values are assigned to the undefined inputs for the test execution. This approach will reduce number of false negatives generated during testing since it will detect certain system implementation errors missed using current methods.

Additional benefits of using the techniques described herein include a reduction of testing costs and effort required to generate test cases, especially compared to many current methods where the user may be forced to choose a process to define all input values in a requirement. Using the techniques described herein, a user may create test vectors with only the required set of inputs and outputs as per the dependency described in requirements, and analysis of the portions of the system implementation driven by defined inputs in the test case can be tested without requiring all inputs to be defined. When a test failure is reported in the expected output in that test failures that occur only for a certain combination of values of undefined inputs, only those combinations of undefined inputs need to be analyzed for why they are impacting expected outputs. This allows for a more focused analysis and quicker resolution of making necessary modifications to the test vectors and/or the system implementation.

In various aspects, system elements, method steps, or examples described throughout this disclosure (such as the system or components thereof, for example) may be implemented on one or more computer systems including a central processing unit (CPU), graphics processing unit (GPU), field programmable gate array (FPGA), application specific integrated circuit (ASIC) and/or similar devices comprising hardware executing code to realize those elements, processes, or examples, said code stored on a non-transient data storage device. These devices include or function with software programs, firmware, or other computer readable instructions for carrying out various methods, process tasks, calculations, and control functions.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented, in part, in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a method, comprising: receiving a test case based on requirements for a system, wherein a first subset of all system inputs includes defined system inputs for the test case, wherein a second subset of all system inputs includes undefined system inputs for the test case; generating extended test vectors from the test case by replacing the undefined system inputs for the test case with different values, wherein each respective extended test vector includes a different combination of values for the undefined system inputs from other extended test vectors; executing the extended test vectors on a target platform for the system; and verifying whether outputs generated during execution of the extended test vectors match expected values for the defined system outputs for the test case.

Example 2 includes the method of Example 1, wherein the different values are selected based on a heuristic type.

Example 3 includes the method of any of Examples 1-2, wherein the different values are selected to be a minimum value or a maximum value of a defined operational range.

Example 4 includes the method of any of Examples 1-3, wherein the different values are selected to be a mid-range value of a defined operational range.

Example 5 includes the method of any of Examples 1-4, wherein the test case includes multiple execution steps to test time-dependent functionality, wherein generating the extended test vectors from the test case includes generating extended test vectors with multiple execution steps, wherein at least one of the execution steps includes different values for each of the extended test vectors.

Example 6 includes the method of any of Examples 1-5, further comprising verifying whether an exception is triggered by execution of the extended test vectors on the target platform.

Example 7 includes the method of any of Examples 1-6, further comprising modifying the system in response to determining that at least one extended test vector fails to satisfy requirements for the test case upon execution.

Example 8 includes the method of Example 7, further comprising: generating additional extended test vectors from the test case by replacing the undefined system inputs for the test case with different values, wherein each respective additional extended test vector includes a different combination of values for the undefined system inputs from other extended test vectors; executing the additional extended test vectors on the target platform for the modified system; and verifying whether outputs generated during execution of the additional extended test vectors match expected values for the defined system outputs for the test case.

Example 9 includes the method of any of Examples 1-8, further comprising modifying the test case and the requirements for the system in response to determining that at least one extended test vector fails to satisfy requirements for the test case upon execution.

Example 10 includes the method of Example 9, further comprising: generating additional extended test vectors from the modified test case by replacing the undefined system inputs for the modified test case with different values, wherein each respective additional extended test vector includes a different combination of values for the undefined system inputs from other extended test vectors; executing the additional extended test vectors on the target platform for the system; and verifying whether outputs generated during execution of the additional extended test vectors match expected values for the defined system outputs for the modified test case.

Example 11 includes a non-transitory, computer readable medium storing instructions which, when executed by one or more processors, cause the one or more processors to perform a process, the process comprising: receiving an original test vector based on requirements for a system, wherein at least one system input is defined for the original test vector and a first system input is undefined for the original test vector, wherein an expected value for at least one output is defined for the original test vector; generating extended test vectors for the original test vector by replacing the first system input that is undefined for the original test vector with different values, wherein each respective extended test vector includes a different value for the first system input; executing the extended test vectors on a target platform; and verifying whether outputs generated during the execution match expected values for the defined system outputs.

Example 12 includes the non-transitory, computer readable medium of Example 11, wherein the instructions, when executed by one or more processors, cause the one or more processors to select the different values based on a configurable heuristic type.

Example 13 includes the non-transitory, computer readable medium of any of Examples 11-12, wherein the configurable heuristic type includes a minimum value of a normal operating range, a maximum value of a normal operating range, alternating between a minimum value and a maximum value of a normal operating, or a mid-range value of a normal operating range.

Example 14 includes the non-transitory, computer readable medium of any of Examples 11-13, wherein values for the at least one defined system input for the original test vector are the same for each extended test vector.

Example 15 includes the non-transitory, computer readable medium of any of Examples 11-14, wherein the original test vector includes two or more execution steps, wherein generating extended test vectors for the original test vector includes generating extended test vectors with two or more execution steps, wherein at least one of the two or more execution steps for each respective extended test vector includes a different value for the first system input compared to other extended test vectors.

Example 16 includes a system, comprising: an input configured to receive information about a system under test, wherein the system under test includes: one or more inputs, wherein a value for at least one input of the one or more inputs is undefined for a test vector based on requirements for the system under test; one or more functions, wherein each function of the one or more functions is configured to generate a respective function output based on, at least in part, a value of at least one of the one or more inputs; and one or more outputs, wherein each output of the one or more outputs is configured to generate a respective output value based on, at least in part, at least one of the respective function outputs; and one or more computational elements coupled to a memory, wherein the one or more computational elements are configured to: receive a test vector file that includes one or more test vectors, wherein each test vector is based on requirements for the system under test, wherein at least one system input is undefined for at least one execution step of each of the one or more test vectors; generate respective extended test vectors for each respective test vector of the one or more test vectors by replacing undefined system inputs for the respective test vector with different values, wherein the respective extended test vectors generated from the respective test vector include different combinations of values for the undefined system inputs for the respective test vector; and generate an extended test vector file that includes the generated extended test vectors for each respective test vector of the one or more test vectors.

Example 17 includes the system of Example 16, wherein the one or more computational elements are further configured to: execute the extended test vector file on a target platform; and verify whether defined system outputs generated during the execution match expected values.

Example 18 includes the system of any of Examples 16-17, wherein the one or more computational elements are further configured to select the different values based on a heuristic type.

Example 19 includes the system of any of Examples 16-18, wherein the one or more computational elements are configured to: generate a first extended test vector by replacing each respective undefined system input with a minimum value of a defined operational range for that respective undefined system input; and generate a second extended test vector by replacing each respective undefined system input with a maximum value of a defined operational range for that respective undefined system input.

Example 20 includes the system of any of Examples 16-19, wherein the one or more test vectors includes a first test vector with multiple execution steps, wherein each of the extended test vectors includes a same number of execution steps as the first test vector, wherein at least one of the execution steps for each respective extended test vector includes a different combination of values for the undefined system inputs compared to other extended test vectors.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method, comprising:
receiving a test case based on requirements for a system, wherein a first subset of all system inputs includes defined system inputs for the test case, wherein a second subset of all system inputs includes undefined system inputs for the test case;
generating extended test vectors from the test case by replacing the undefined system inputs for the test case with different values, wherein each respective extended test vector includes a different combination of values for the undefined system inputs from other extended test vectors;
executing the extended test vectors on a target platform for the system; and
verifying whether outputs generated during execution of the extended test vectors match expected values for defined system outputs for the test case.

2. The method of claim 1, wherein the different values are selected based on a heuristic type.

3. The method of claim 1, wherein the different values are selected to be a minimum value or a maximum value of a defined operational range.

4. The method of claim 1, wherein the different values are selected to be a mid-range value of a defined operational range.

5. The method of claim 1, wherein the test case includes multiple execution steps to test time-dependent functionality, wherein generating the extended test vectors from the test case includes generating extended test vectors with multiple execution steps, wherein at least one of the execution steps includes different values for each of the extended test vectors.

6. The method of claim 1, further comprising verifying whether an exception is triggered by execution of the extended test vectors on the target platform.

7. The method of claim 1, further comprising modifying the system in response to determining that at least one extended test vector fails to satisfy requirements for the test case upon execution.

8. The method of claim 7, further comprising:
generating additional extended test vectors from the test case by replacing the undefined system inputs for the test case with different values, wherein each respective additional extended test vector includes a different combination of values for the undefined system inputs from other extended test vectors;
executing the additional extended test vectors on the target platform for the modified system; and
verifying whether outputs generated during execution of the additional extended test vectors match expected values for the defined system outputs for the test case.

9. The method of claim 1, further comprising modifying the test case and the requirements for the system in response to determining that at least one extended test vector fails to satisfy requirements for the test case upon execution.

10. The method of claim 9, further comprising:
generating additional extended test vectors from the modified test case by replacing the undefined system inputs for the modified test case with different values, wherein each respective additional extended test vector includes a different combination of values for the undefined system inputs from other extended test vectors;
executing the additional extended test vectors on the target platform for the system; and
verifying whether outputs generated during execution of the additional extended test vectors match expected values for the defined system outputs for the modified test case.

11. A non-transitory, computer readable medium storing instructions which, when executed by one or more processors, cause the one or more processors to perform a process, the process comprising:
receiving an original test vector based on requirements for a system, wherein at least one system input is defined for the original test vector and a first system input is undefined for the original test vector, wherein an expected value for at least one output is defined for the original test vector;
generating extended test vectors for the original test vector by replacing the first system input that is undefined for the original test vector with different values, wherein each respective extended test vector includes a different value for the first system input;
executing the extended test vectors on a target platform; and
verifying whether outputs generated during the execution match expected values for defined system outputs.

12. The non-transitory, computer readable medium of claim 11, wherein the instructions, when executed by one or more processors, cause the one or more processors to select the different values based on a configurable heuristic type.

13. The non-transitory, computer readable medium of claim 11, wherein the configurable heuristic type includes a minimum value of a normal operating range, a maximum value of a normal operating range, alternating between a minimum value and a maximum value of a normal operating, or a mid-range value of a normal operating range.

14. The non-transitory, computer readable medium of claim 11, wherein values for the at least one defined system input for the original test vector are the same for each extended test vector.

15. The non-transitory, computer readable medium of claim 11, wherein the original test vector includes two or more execution steps, wherein generating extended test vectors for the original test vector includes generating extended test vectors with two or more execution steps, wherein at least one of the two or more execution steps for each respective extended test vector includes a different value for the first system input compared to other extended test vectors.

16. A system, comprising:

an input configured to receive information about a system under test, wherein the system under test includes:

one or more inputs, wherein a value for at least one input of the one or more inputs is undefined for a test vector based on requirements for the system under test;

one or more functions, wherein each function of the one or more functions is configured to generate a respective function output based on, at least in part, a value of at least one of the one or more inputs; and one or more outputs, wherein each output of the one or more outputs is configured to generate a respective output value based on, at least in part, at least one of the respective function outputs; and one or more computational elements coupled to a memory, wherein the one or more computational elements are configured to:

receive a test vector file that includes one or more test vectors, wherein each test vector is based on requirements for the system under test, wherein at least one system input is undefined for at least one execution step of each of the one or more test vectors;

generate respective extended test vectors for each respective test vector of the one or more test vectors by replacing undefined system inputs for the respective test vector with different values, wherein the respective extended test vectors generated from the respective test vector include different combinations of values for the undefined system inputs for the respective test vector; and generate an extended test vector file that includes the generated respective extended test vectors for each respective test vector of the one or more test vectors.

17. The system of claim 16, wherein the one or more computational elements are further configured to:

execute the extended test vector file on a target platform; and verify whether defined system outputs generated during the execution match expected values.

18. The system of claim 16, wherein the one or more computational elements are further configured to select the different values based on a heuristic type.

19. The system of claim 16, wherein the one or more computational elements are configured to:

generate a first extended test vector by replacing each respective undefined system input with a minimum value of a defined operational range for that respective undefined system input; and generate a second extended test vector by replacing each respective undefined system input with a maximum value of a defined operational range for that respective undefined system input.

20. The system of claim 16, wherein the one or more test vectors includes a first test vector with multiple execution steps, wherein each of the respective extended test vectors includes a same number of execution steps as the first test vector, wherein at least one of the execution steps for each respective extended test vector includes a different combination of values for the undefined system inputs compared to other extended test vectors.

* * * * *